(12) United States Patent
King

(10) Patent No.: US 8,487,889 B2
(45) Date of Patent: Jul. 16, 2013

(54) VIRTUAL DRAFTING TOOLS

(75) Inventor: Nicholas V. King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 12/688,781

(22) Filed: Jan. 15, 2010

(65) Prior Publication Data

US 2011/0175821 A1 Jul. 21, 2011

(51) Int. Cl.
*G06F 3/041* (2006.01)

(52) U.S. Cl.
USPC .......................................... 345/173; 345/156

(58) Field of Classification Search
USPC .................. 345/173, 156; 715/706, 757, 771, 715/773, 964
See application file for complete search history.

(56) References Cited

U.S. PATENT DOCUMENTS

| | | | |
|---|---|---|---|
| 5,119,079 | A | 6/1992 | Hube et al. |
| 5,798,752 | A | 8/1998 | Buxton et al. |
| 5,914,716 | A | 6/1999 | Rubin et al. |
| 6,049,328 | A | 4/2000 | Vanderheiden |
| 6,331,840 | B1 | 12/2001 | Nielson et al. |
| 2002/0018051 | A1 | 2/2002 | Singh |
| 2005/0057524 | A1 | 3/2005 | Hill et al. |
| 2005/0193351 | A1 | 9/2005 | Huoviala |
| 2006/0026521 | A1 | 2/2006 | Hotelling et al. |
| 2006/0026535 | A1 | 2/2006 | Hotelling et al. |
| 2006/0036944 | A1 | 2/2006 | Wilson |
| 2006/0181519 | A1 | 8/2006 | Vernier et al. |
| 2006/0267966 | A1 | 11/2006 | Grossman et al. |
| 2007/0097096 | A1 | 5/2007 | Rosenberg |
| 2007/0198950 | A1 | 8/2007 | Dodge et al. |
| 2007/0247443 | A1 | 10/2007 | Philipp |
| 2008/0046425 | A1 | 2/2008 | Perski |
| 2008/0165140 | A1 | 7/2008 | Christie et al. |

OTHER PUBLICATIONS

Butler, C., "Exploring Bimanual Tool-Based Interaction in a Drawing Environment," A thesis submitted to the Graduate Faculty of North Carolina State University in partial fulfillment of the requirements for the Degree of Master of Science Computer Science, Raleigh 2004, 85 pages.

"Multimodal Requirements for Voice Markup Languages," W3C Working Draft Jul. 10, 2000 [online] [retrieved on Nov. 24, 2009]. Copyright ©2000 WC3®. Retrieved from: http://www.w3.org/TR/multimodal-reqs., 18 pages.

Nezu, T., "Mitsubishi Demos '3D Touch Panel'—Tech-On!" Nikkei Electronics, Mar. 11, 2009 [online] [retrieved on Jan. 15, 2010]. Retrieved from: http://techon.nikkeibp.co.jp/english/NEWS_EN/20090310/166952/?P=1, 2 pages. Rekimoto, J., Ishizawa, T., Schwesig, C., Oba, H., "PreSense: Interaction Techniques for Finger Sensing Input Devices," [online] UIST '03 Vancouver, BC, Canada, ©ACM 2003, CHI Letters, vol. 5, Issue 2, Retieved from: ftp.csl.sony.co.jp/person/rekimoto/papers/rekimoto-uist03.pdf, pp. 203-212.

*Primary Examiner* — Ricardo L Osorio

(74) *Attorney, Agent, or Firm* — Morgan, Lewis & Bockius LLP

(57) ABSTRACT

Techniques for using virtual tools are disclosed. In one aspect, a user interface is presented. A first touch input including touch inputs at two or more locations is received, and a virtual tool corresponding to the relative positions of the two or more locations is identified. A second touch input interacting with the virtual tool is received, and a graphical object corresponding to the identified virtual tool and the second touch input is presented. In another aspect, an input activating a drafting mode of a device is received, and a drafting user interface is presented. A second touch input including touch inputs at two or more locations is received, and a third touch input is received. A graphical object corresponding to the third touch input and a virtual drafting tool corresponding to the second touch input is generated and presented.

28 Claims, 21 Drawing Sheets

VIRTUAL DRAFTING TOOLS

TECHNICAL FIELD

This subject matter is generally related to computer-aided design and drafting.

BACKGROUND

Computer-aided design (CAD) programs and other drafting applications allow users to create two-dimensional and three-dimensional graphical objects on a virtual drafting area. However, conventional CAD user interfaces often require users to act in non-intuitive ways. For example, if a user wants to draw a straight line, the user typically moves a cursor from the drafting area to a tool menu or bar, selects a tool for drawing a straight line, then returns the cursor to the drafting area and specifies the start and end points for the line. These multiple steps are time consuming and can result in inefficient drafting.

SUMMARY

Techniques and systems supporting the use of virtual tools in a drafting application are disclosed. These techniques can be used to match user input defining a tool to a virtual tool, and process user input using the tool.

In one aspect, a user interface is presented on a display of a device. A first touch input including touch inputs at two or more locations is received, and a virtual tool corresponding to the relative positions of the two or more locations is identified. A second touch input interacting with the virtual tool is received, and a graphical object corresponding to the identified virtual tool and the second touch input is presented in the user interface.

In another aspect, an input activating a drafting mode of a device is received, and a drafting user interface is presented. A second touch input including touch inputs at two or more locations is received, and a third touch input is received. A graphical object corresponding to the third touch input and a virtual drafting tool corresponding to the second touch input is generated and presented in the drafting user interface.

Particular embodiments of the subject matter described in this specification can be implemented to realize one or more of the following advantages. Users can intuitively interact with a drafting application. Users can indicate what drafting tools are desired by the position of their fingers (or other input devices), without needing to interact with menus or other user interface elements in the drafting application. Users can easily indicate whether graphics objects should be draft objects without needing to interact with menus in the drafting application. Users can easily indicate the appropriate thickness of lines making up graphics objects without needing to interact with menus in the drafting application.

DESCRIPTION OF DRAWINGS

Like reference numbers and designations in the various drawings indicate like elements.

DETAILED DESCRIPTION

Example Device

Figure 1:
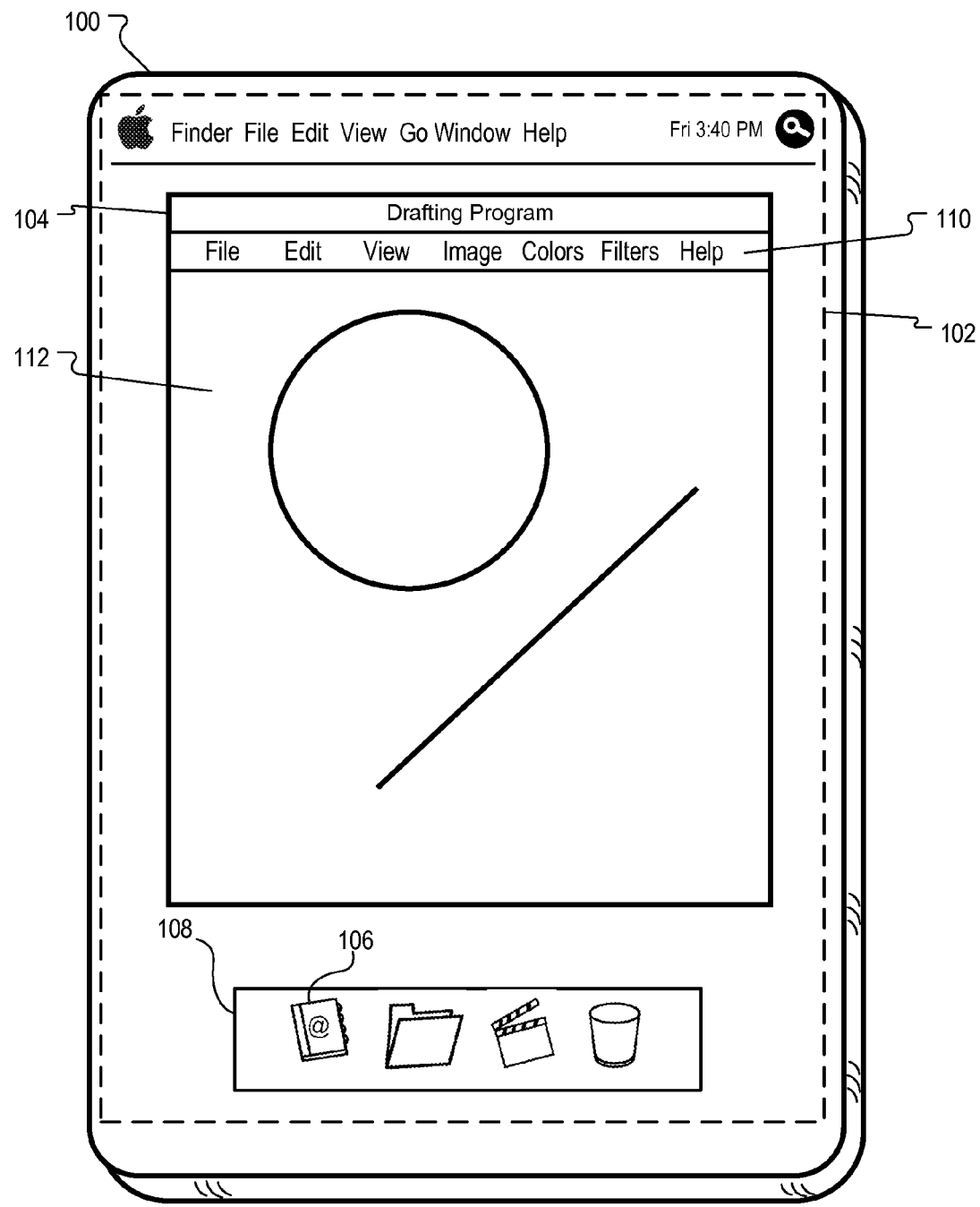
FIG. 1 illustrates an example device.

FIG. 1 illustrates example device 100. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

Device Overview

In some implementations, device 100 includes touch-sensitive display 102. Touch-sensitive display 102 can implement liquid crystal display (LCD) technology, light emitting polymer display (LPD) technology, or some other display technology. Touch sensitive display 102 can be sensitive to haptic and/or tactile contact with a user. In some implementations, touch-sensitive display 102 is also sensitive to touch inputs received in proximity to, but not actually touching, display 102. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other pointing device.

A user can interact with device 100 using various touch inputs, e.g., when a user touches touch sensitive display 102. Gesture inputs can also be derived from multiple touch inputs, e.g., where a user moves his or her finger (or other input tool) across touch sensitive display 102. An example gesture input is a swipe input, where a user swipes his or her finger (or other input tool) across touch-sensitive display 102. In some implementations, device 100 can detect inputs that are received in direct contact with display 102, or that are received within a particular vertical distance of display 102 (e.g., within one or two inches of display 102). Users can simultaneously provide input at multiple locations on display 102. For example, inputs simultaneously touching at two or more locations can be received.

In some implementations, device 100 can display one or more graphical user interfaces on touch-sensitive display 102 for providing the user access to various system objects and for conveying information to the user. In some implementations, the graphical user interface can include one or more display objects, e.g., display objects 104 and 106. In the example shown, display objects 104 and 106 are graphic representations of system objects. Some examples of system objects include device functions, applications, windows, files, alerts, events, or other identifiable system objects. In some implementations, the display objects can be configured by a user, e.g., a user may specify which display objects are displayed, and/or may download additional applications or other software that provides other functionalities and corresponding display objects.

Example Device Functionality

In some implementations, device 100 can implement various device functionalities. As part of one or more of these functionalities, device 100 presents graphical user interfaces on touch-sensitive display 102 of device 100, and also responds to touch input received from a user, for example, through touch-sensitive display 102. For example, a user can invoke various functionality by launching one or more applications on the device. A user can invoke functionality, for example, by touching one of the display objects in menu bar 108 of the device. A user can alternatively invoke particular functionality in other ways including, for example, using one of user-selectable menus 109 included in the user interface.

Once an application has been selected, one or more windows or pages corresponding to the application can be displayed on display 102 of device 100. A user can navigate through the windows or pages by touching appropriate places on display 102. For example, window 104 corresponds to a drafting (or drawing) application. When the drafting application is launched on the device, the device enters a drafting mode. In the drafting mode, the user can use virtual tools to indicate that shapes, lines, and other graphical objects should be displayed in application view window 112, as will be described in more detail below.

Example Interactions with a Drafting User Interface

Virtual Ruler

Figure 2A:
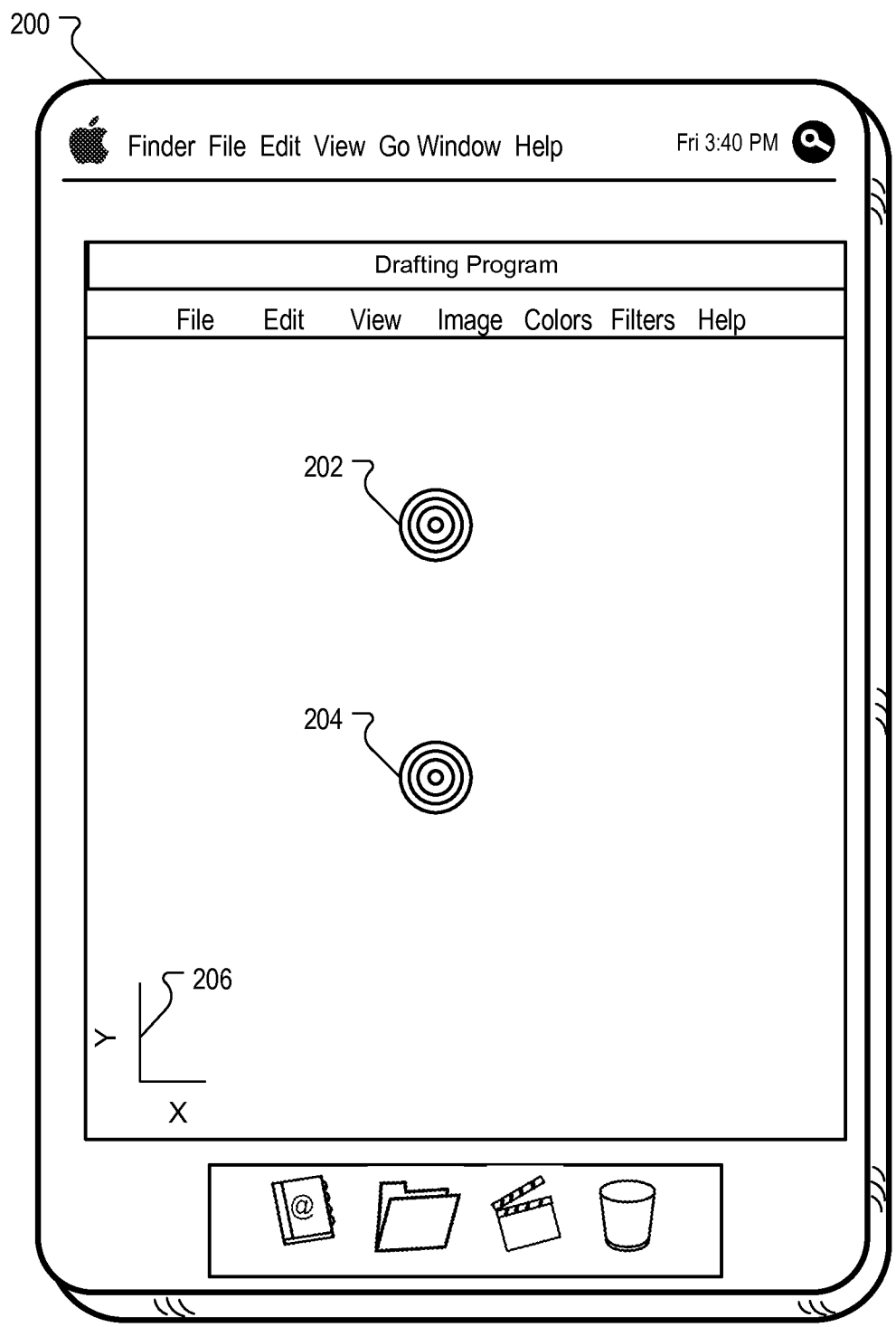
FIG. 2A illustrates an example drafting user interface displayed on a device.

FIG. 2A illustrates example drafting user interface 201 displayed on device 200. Drafting user interface 201 is one example interface; however, other types of user interfaces can alternatively be used.

Device 200 enters a drafting mode, for example, when a user launches a drafting application, causing drafting user interface 201 to be displayed on device 200. In drafting mode, device 200 maps touch inputs to stored data defining virtual tools and interactions with of virtual tools. For example, the user can provide a touch input to device 200 to indicate a particular virtual tool that the user wants to use. The touch input can include one or more simultaneous touch inputs at different locations. The user can then use a second touch input to indicate that device 200 should create and display a graphical object corresponding to the virtual tool and the second touch input.

Device 200 can continue to detect the first touch input while the second touch input is received. Alternatively, the effect of the first touch input can persist, for example, for a predetermined amount of time after the first touch input ends. Device 200 can associate the second touch input with a virtual tool corresponding to the first touch input when the second input is received within the predetermined amount of time. In some implementations, the effect of the first touch input persists, or does not persist, according to the type of tool. For example, some tools can be defined on the device as not persisting, while others can be defined as persisting.

When the touch input persists for a predetermined period of time, device 200 can differentiate between input adjusting the tool (e.g., repositioning, orienting, or scaling the tool) and input using the tool according to the location where the input is received. For example, input within the boundaries of the tool can be treated as input modifying the tool, while input outside the tool can be treated as input using the tool.

A graphical object can be, for example, a shape, a line, or an object (e.g., a three-dimensional object). A virtual tool can be a virtual representation of a tool that can be used by a user when drafting. Virtual tools can, but need not, be associated with a visual representation that can be displayed on device 200.

Virtual tools can correspond to physical tools that are commonly used by drafters. Some examples of virtual tools of this type include a ruler, a t-square, a protractor, a compass, and various stencils that can be traced. Virtual tools can also correspond to user-defined tools. User defined tools are tools defined by a user to have particular properties, and need not correspond to physical drafting tools. In some implementations, selectable representations of tools, for example, user defined tools, are displayed in the drafting user interface to allow a user to edit data for the tool.

While the examples described below describe using a single tool at a time, in some implementations, the device allows a user to interact with multiple tools simultaneously.

In the example illustrated in FIG. 2A, the user simultaneously touches the user interface in two places 202 and 204. Device 200 compares the relative positions of the input locations (e.g., along x- and y-axes 206) to stored data for virtual tools, and selects a virtual ruler as best matching user touch inputs 202 and 204.

A device can identify a ruler tool as the tool best matching user touch inputs when the user simultaneously provides touch inputs at two locations on the drafting user interface. For example, if the x and y axes of the two touch inputs are within a threshold distance of each other (e.g., parallel or slightly off parallel), the ruler tool can be identified. Alternatively, the ruler tool can be identified as running directly between the two touch inputs specified by a user (e.g., to allow the user to use the ruler at a desired angle).

Figure 2B:
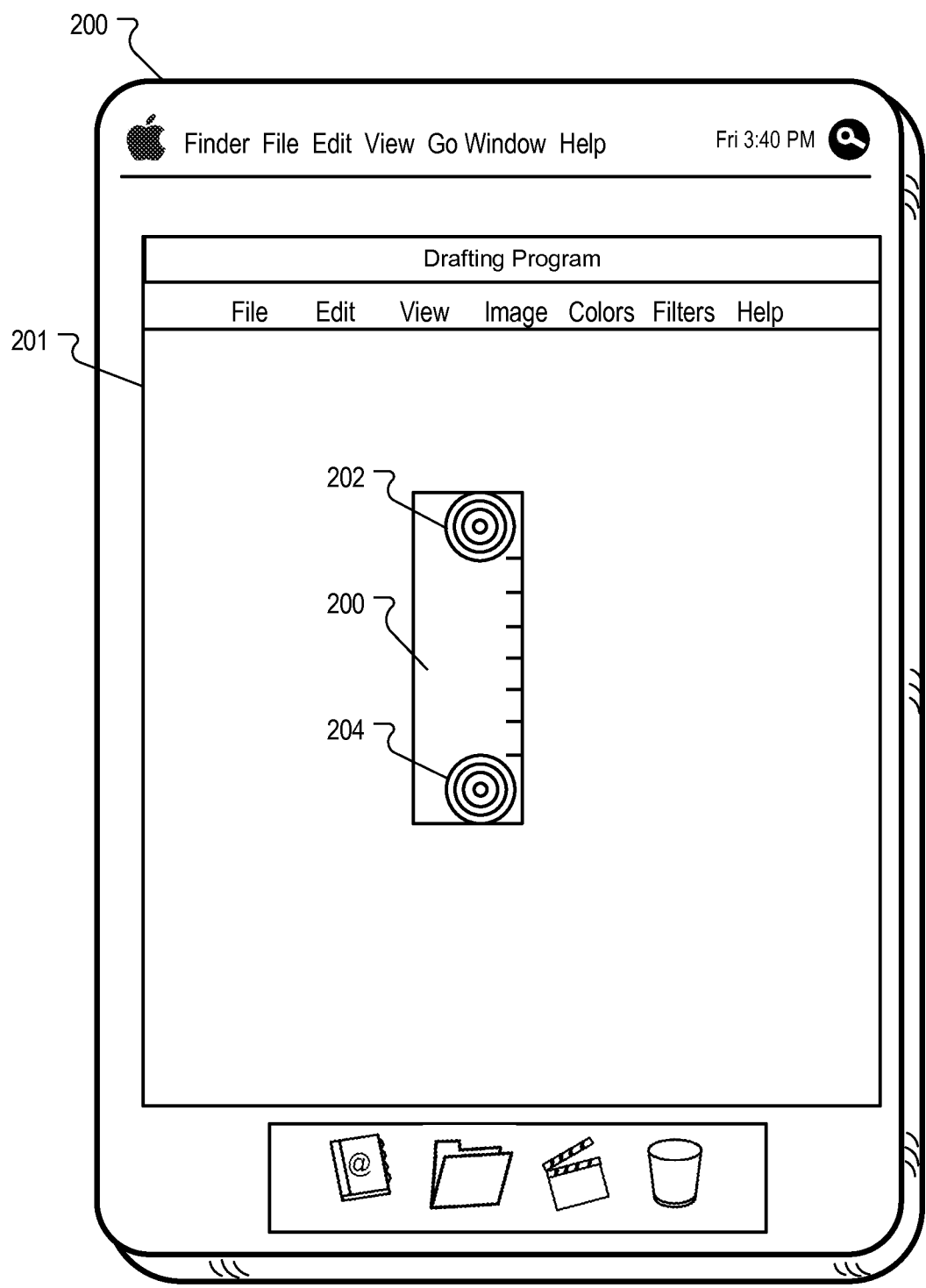
FIG. 2B illustrates an example visual representation of a virtual ruler.

FIG. 2B illustrates an example visual representation of virtual ruler 220. The length of the ruler is defined by the distance between touch inputs 202 and 204. While FIG. 2B illustrates the user continuing to provide touch inputs 202 and 204 while the visual representation of the virtual tool 220 is displayed, in some implementations, visual representation of tool 220 will persist for a predetermined amount of time after the user stops providing the touch inputs defining the length of the ruler.

For illustrative purposes, the right edge of tool 220 is shown as immediately adjacent to user touch inputs 202 and 204. However, in some implementations, the overall distances of the edges of tool 220 from the user touch inputs can be set according to user preferences. In addition, the user can specify whether the left edge or the right edge of tool 220 is closer to touch inputs 202 and 204, for example, to accommodate both right-handed and left-handed users.

In some implementations, other aspects of the visual appearance of tool 220 can also be determined according to user preferences. For example, the user can specify one or more of the preferred units (e.g., metric units, English units, or both) displayed on tool 220, the color of tool 220, the transparency of tool 220, the width of tool 220, and the material of tool 220 (wood, metal, plastic, etc.). In some implementations, the user can use a particular touch input to indicate that one or more of the details of the visual appearance of tool 220 should be changed. For example, the user can tap the fingers used to input the touch input at locations 202 and 204 to indicate that a different unit set should be displayed on tool 220. For example, for each tap the units can alternate between English and metric in a cyclic manner with a corresponding change in tic spacing shown in the visual representation of the virtual ruler.

In some implementations, the user can use pinching gestures to adjust the overall length of tool 220 by moving his or her fingers further apart (resulting in a longer ruler) or closer together (resulting in a shorter ruler) on the drafting user interface. In some implementations, tool 220 can be detached or "floating" on the drafting use interface to allow the user to use one or more fingers to drag or rotate tool 220 in the drafting user interface.

Figure 2C:
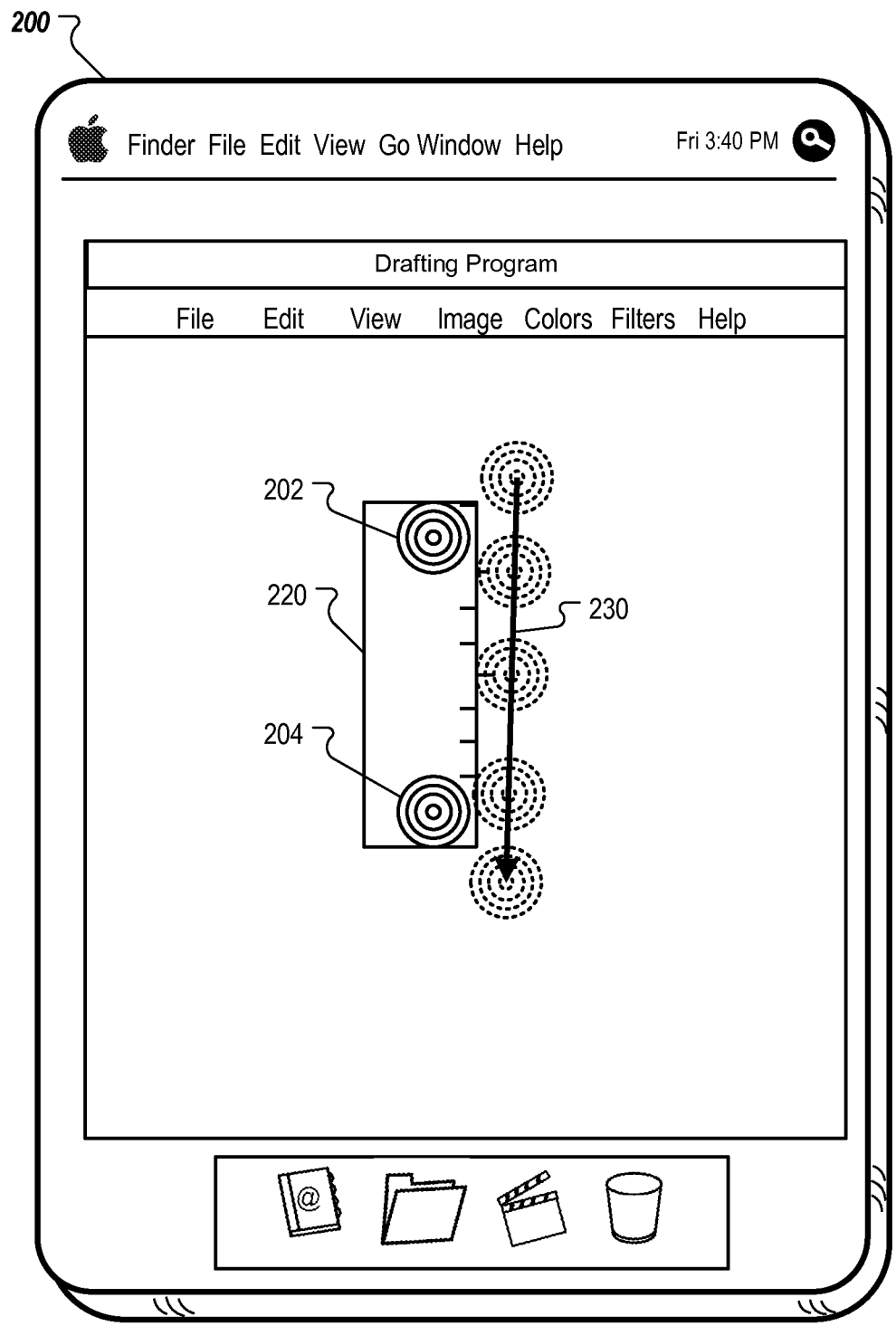
FIG. 2C illustrates a user entering touch input interacting with the virtual ruler of FIG. 2B.

FIG. 2C illustrates a user entering touch input interacting with the virtual ruler of FIG. 2B. In FIG. 2C, the user enters touch input 230 and performs a swiping gesture (e.g., a vertical swipe) in the drafting user interface. In response, device 200 generates a graphical object corresponding to a template associated with the virtual ruler tool and user touch input 230.

In some implementations, the distance between the user's fingers and the drafting user interface (e.g., in the z-direction) can govern visual details of the resulting graphical object displayed in the drafting user interface. For example, in some implementations, the thickness of the line(s) of the graphical object can be determined by the distance of user fingers; the further away the fingers, the lighter the line(s). The correlation between thickness of line and distance can be continuous, or can be discrete, e.g., according to discrete levels. As another example, the line(s) are draft line(s) if the user's fingers are not touching the drafting user interface, and are final lines if the user's fingers are touching the drafting user interface. Draft lines can differ in appearance from final lines. For example, draft lines can be lighter or dashed lines while final lines can be solid or heavier lines. Draft lines can also differ in function. For example, draft lines can extend beyond their intersection with other lines in the user interface. Users can then manually "snap" other lines being drawn to intersections with the draft lines. A user can also provide input to selectively hide and/or delete unused draft lines once a drawing is complete. In some implementations, a user can cause a draft line to become a final line, for example, by using a gesture input to trace the draft line or selecting the draft line (or a portion of the draft line) and providing input indicating that the draft line should be made final.

In other implementations, the pressure of the fingers on the drafting user interface determines the thickness of the lines. Light pressure results in light lines or dashed lines and hard pressure results in thick or solid lines.

Figure 2D:
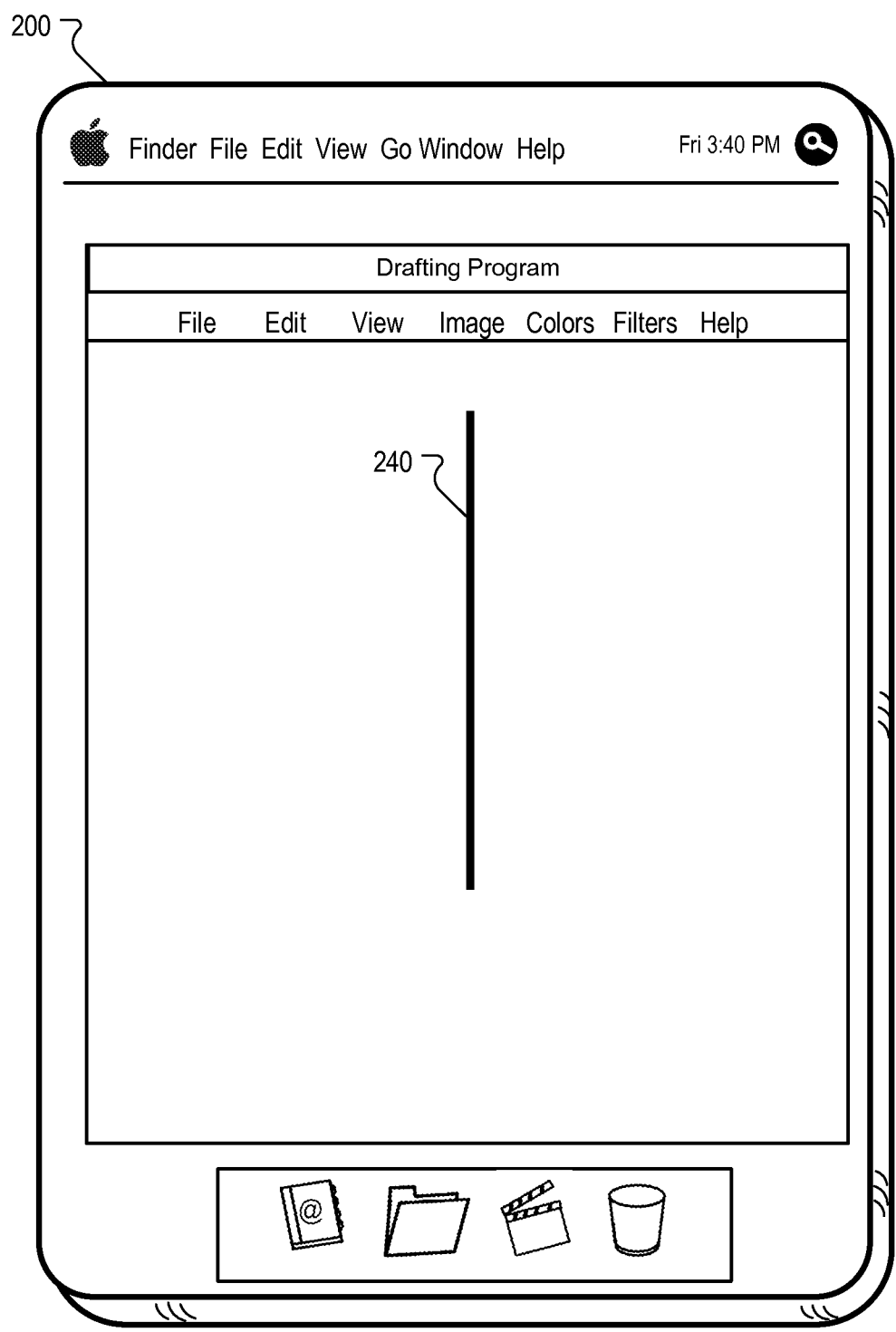
FIG. 2D illustrates a graphical object resulting from the touch input of FIG. 2C.

FIG. 2D illustrates a graphical object resulting from the touch input interacting with the virtual ruler. The graphical object is a straight vertical line 240.

Virtual Protractor

Figure 3A:
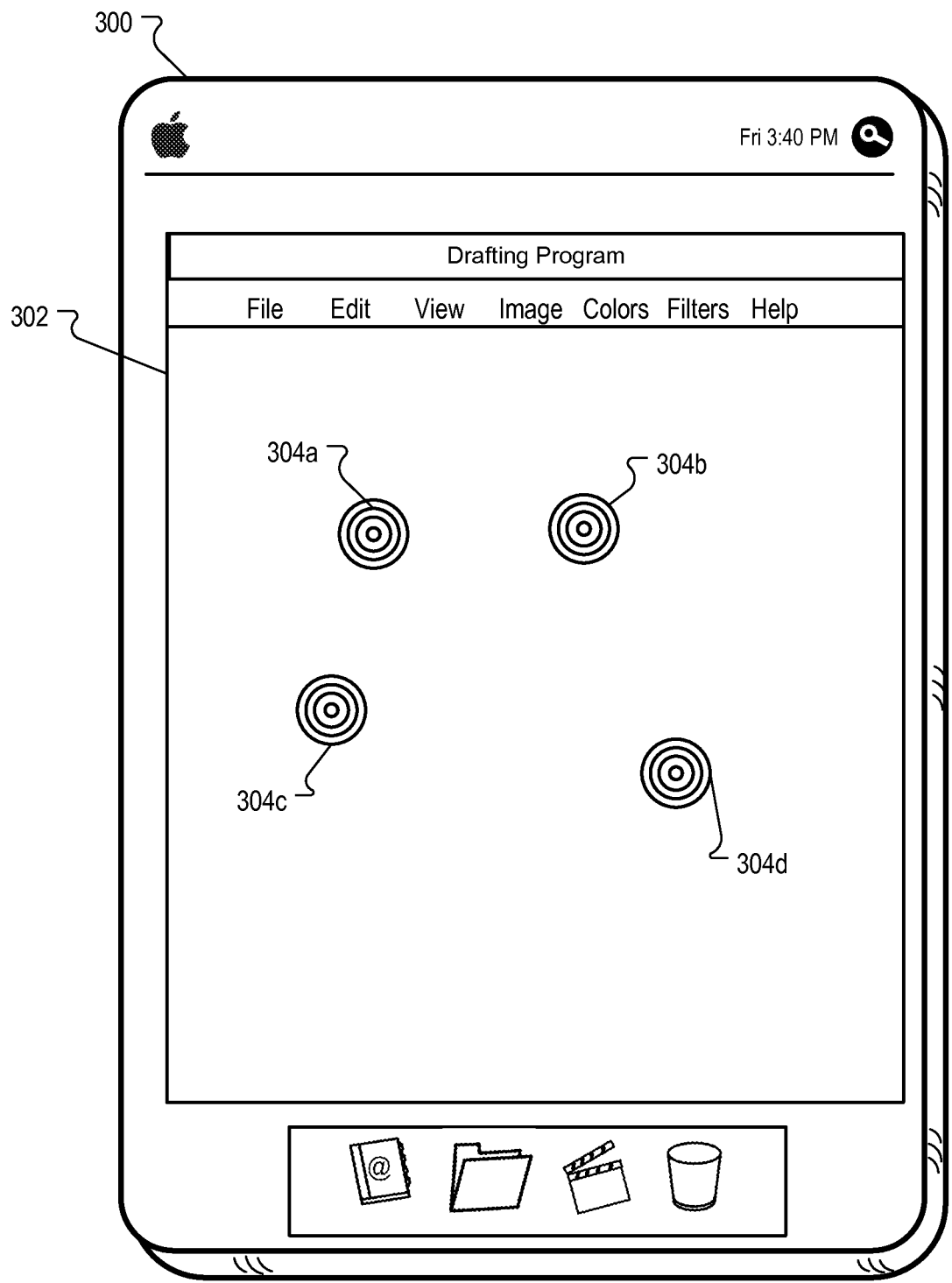
FIG. 3A illustrates an example drafting user interface on a device receiving touch input from a user specifying a virtual protractor.

FIG. 3A illustrates example drafting user interface 302 on device 300 receiving touch input 304 from a user specifying a virtual protractor. The user provides touch input at four locations, 304a, 304b, 304c, and 304d. Device 300 matches this input to a virtual protractor.

Figure 3B:
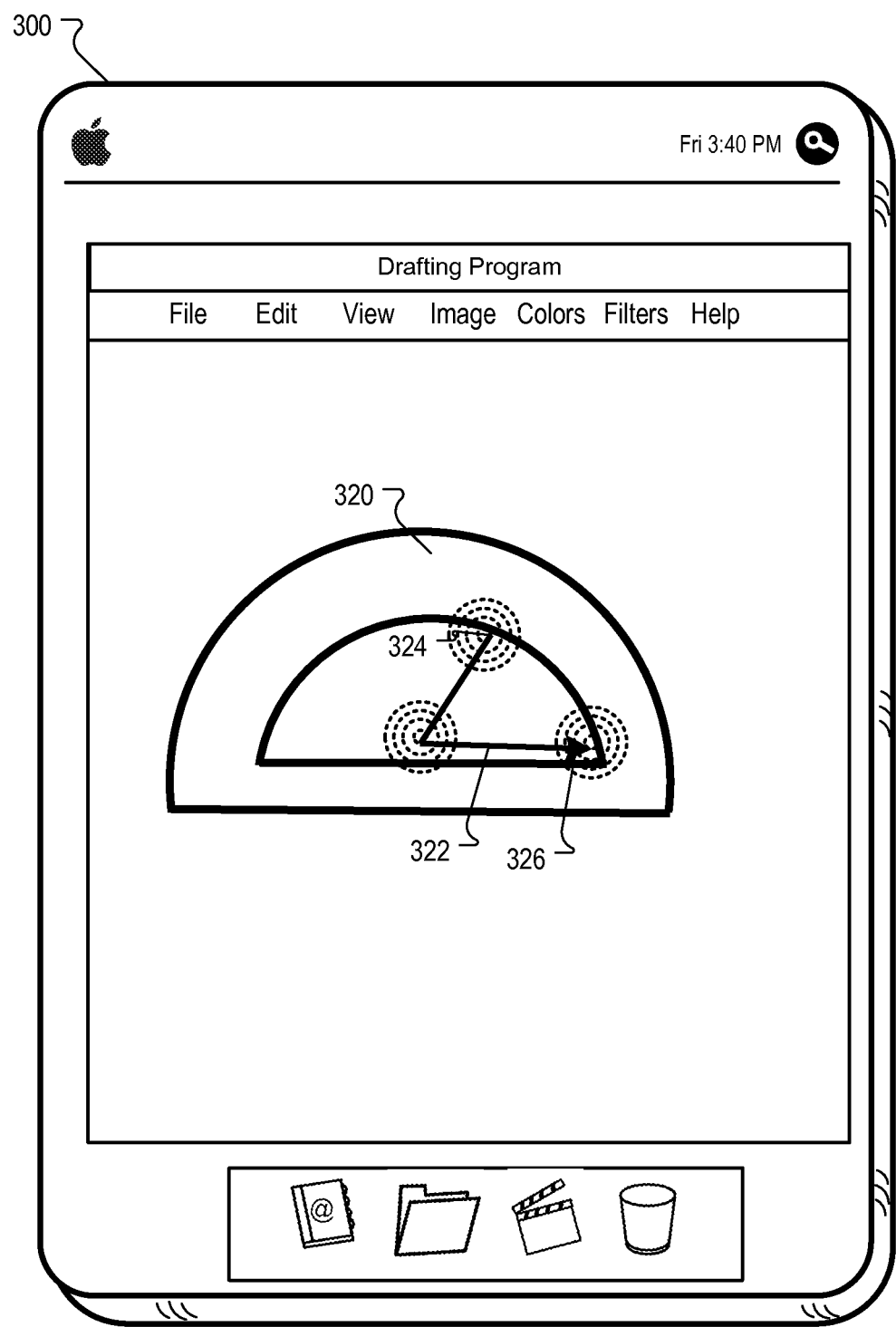
FIG. 3B illustrates an example visual representation of the virtual protractor of FIG. 3A, and touch input interacting with the virtual protractor.

FIG. 3B illustrates example visual representation of virtual protractor 320 of FIG. 3A, and user touch input 322 interacting with virtual protractor 320. The user provides touch input 322 by starting touching at location 324, making a sliding or dragging gesture on the drafting user interface, ending the gesture at location 326 on the drafting user interface.

Figure 3C:
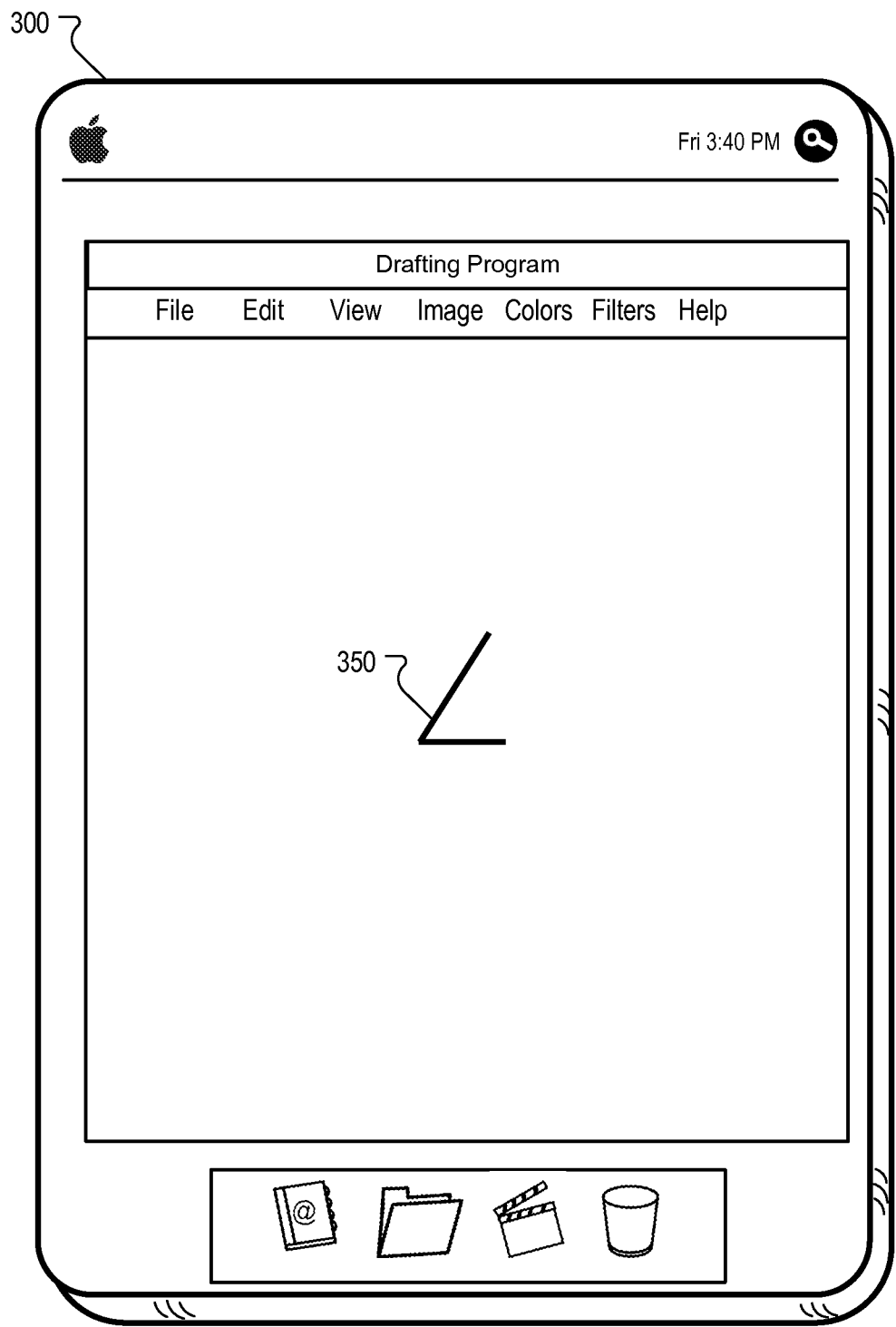
FIG. 3C illustrates a graphical object resulting from the touch input of FIG. 3B.

Device 300 determines the appropriate angle indicated by x and y positions of touch input 322 relative to the base of the virtual protractor and draws an angle corresponding to the touch inputs 322 and 326. FIG. 3C illustrates graphical object 350 resulting from the touch inputs 322 and 326 of FIG. 3B.

The user can also interact with the protractor in other ways, for example, tracing part of a curve along either the inside or outside edge of the protractor.

Virtual Compass

Figure 4A:
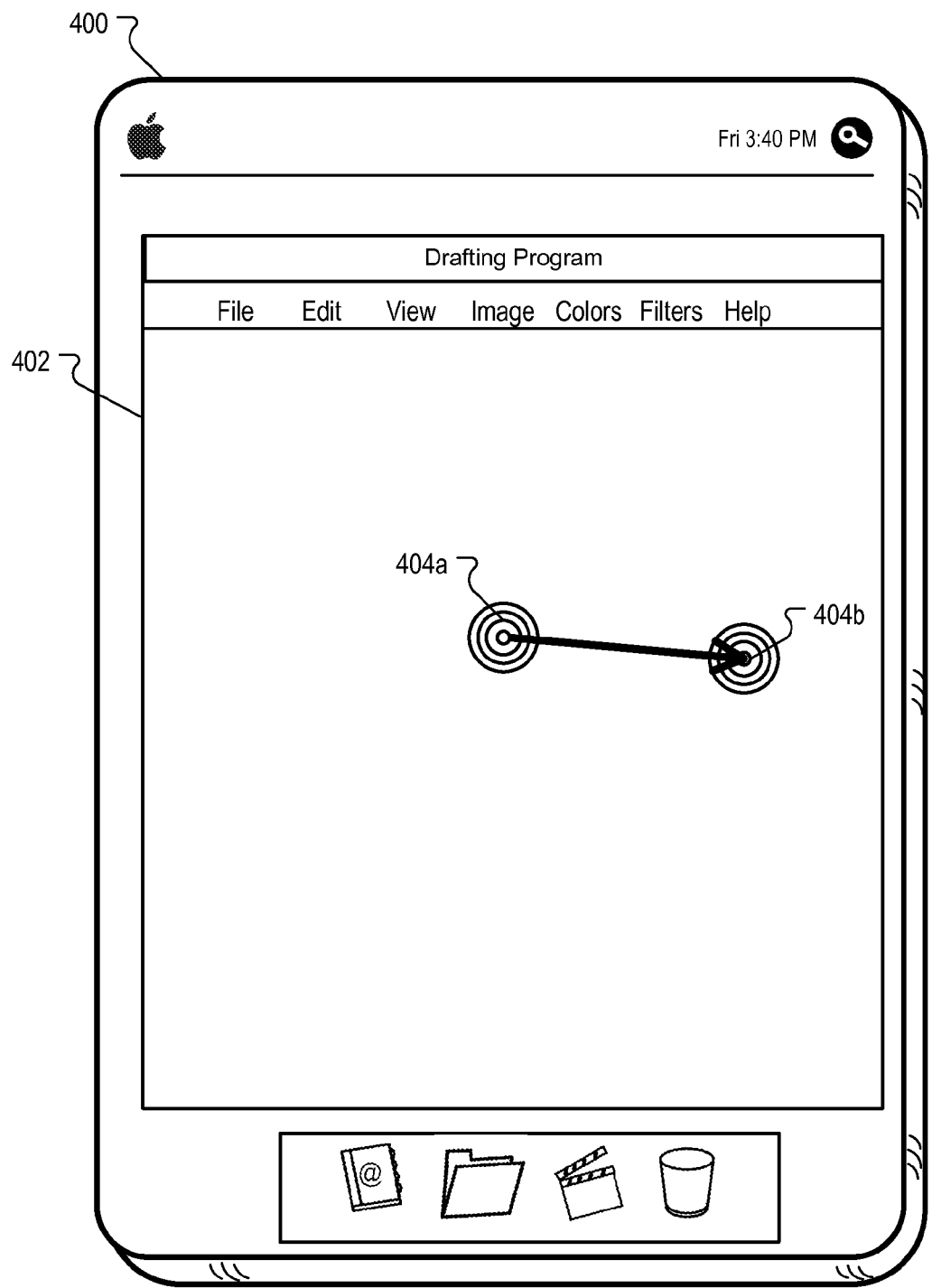
FIG. 4A illustrates an example drafting user interface receiving touch input from a user specifying a virtual compass.

FIG. 4A illustrates example drafting user interface 402 on device 400 receiving touch input 404 from a user specifying a virtual compass. The user provides touch input at location 404a, and then provides gesture input to location 404b, e.g., by dragging his or her finger to location 404b. Device 400 matches this input to a virtual compass having a preset radius equal to the distance between locations 404a and 404b.

Other definitions of the virtual compass can also be used. For example, a user can provide simultaneous touch input at locations 404a and 404b, and then provide a gesture input (e.g., rotating down and to the left) indicating that a virtual compass is desired.

Figure 4B:
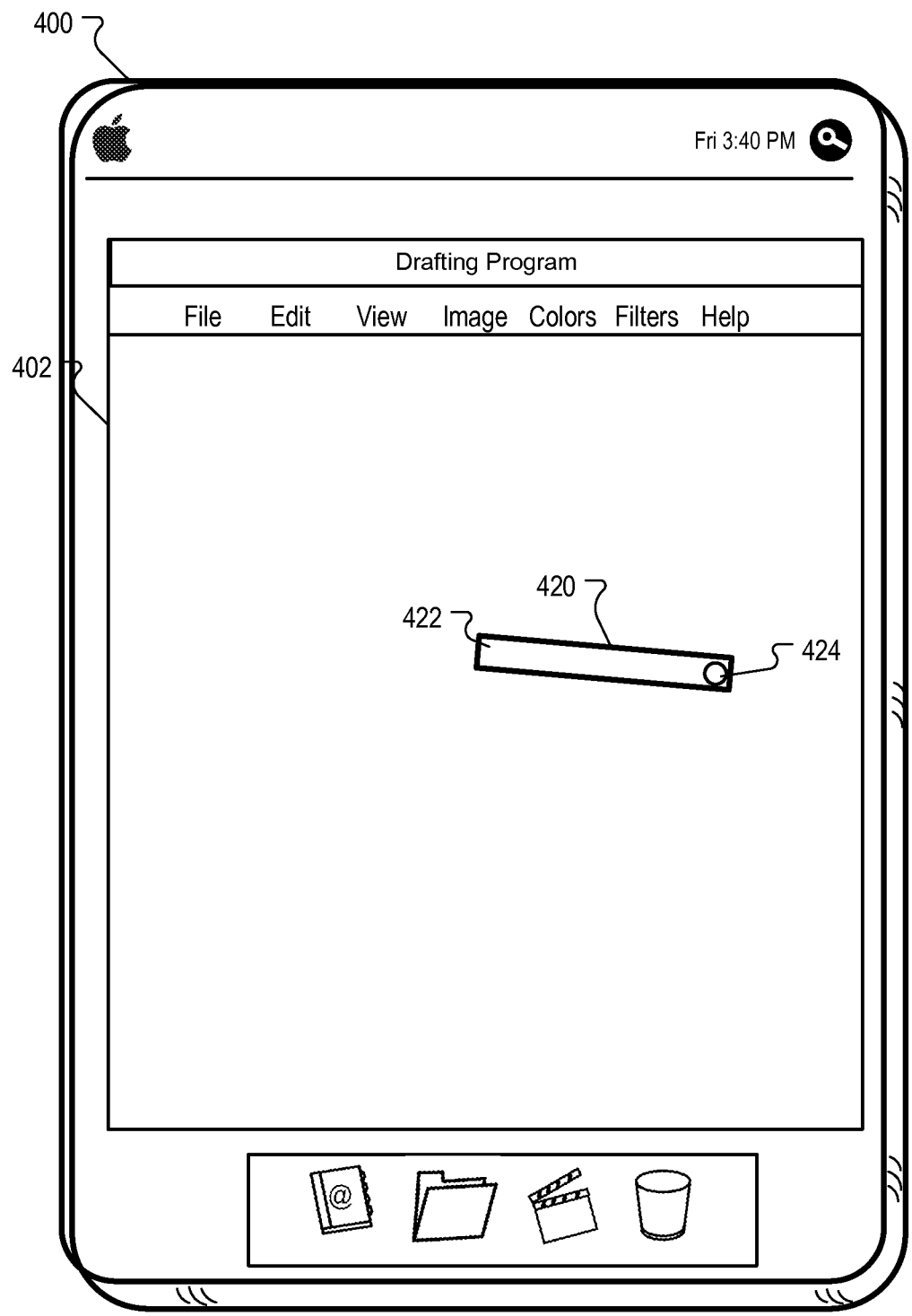
FIG. 4B illustrates an example visual representation of the virtual compass of FIG. 4A.

FIG. 4B illustrates example visual representation 420 of the virtual compass of FIG. 4A. Left end 422 of virtual compass 420 marks the axis of rotation, while right end 422 (the end with the circle) of the compass is free to be rotated by a user using the dragging gesture. When the user drags the end of the virtual compass in a circular gesture, the resulting input can be "snapped" into a circle having the desired radius determined by the distance between locations 404a and 404b.

Figure 4C:
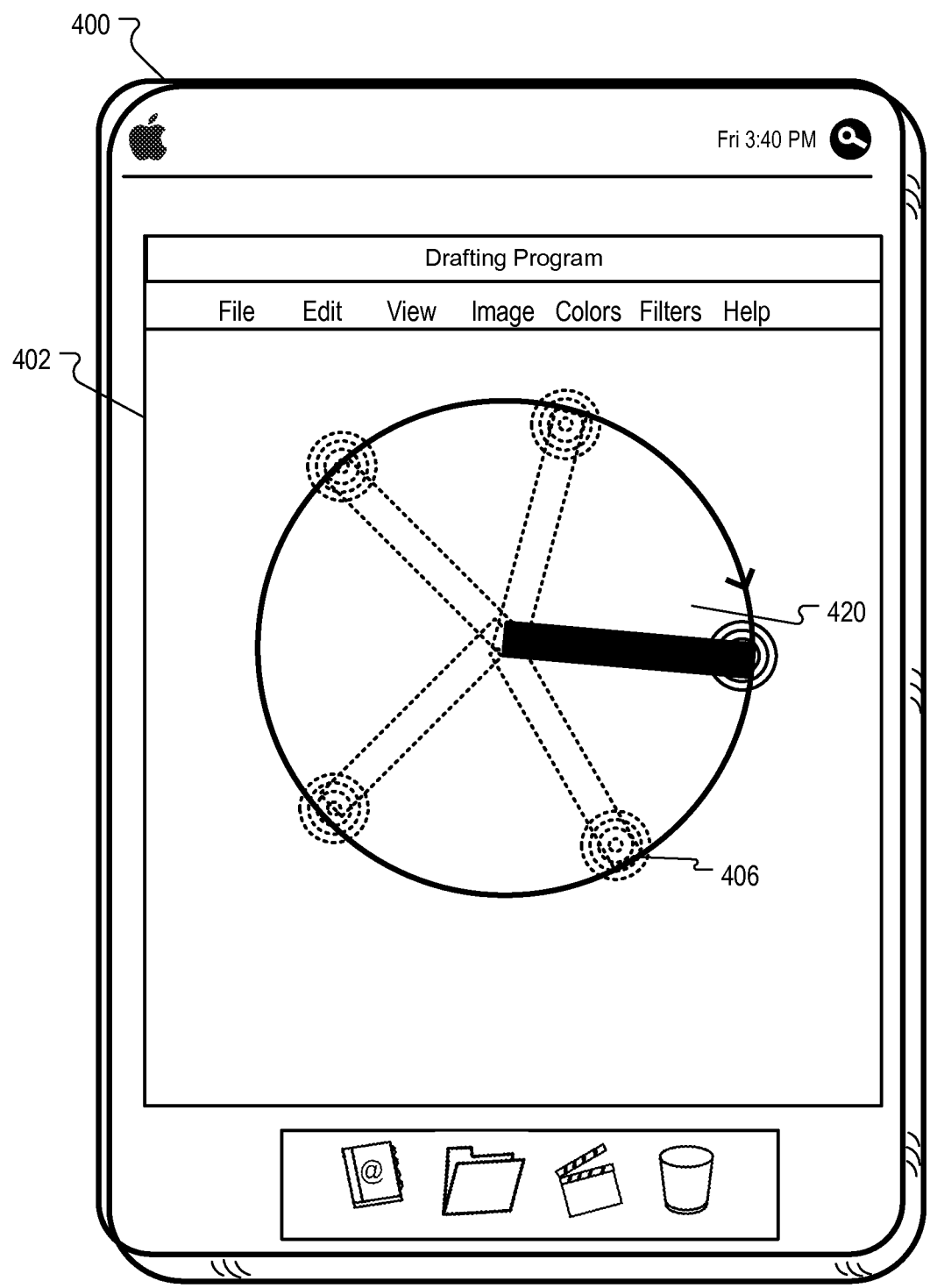
FIG. 4C illustrates an example of a user entering touch input interacting with the virtual compass of FIG. 4B.

FIG. 4C illustrates an example of a user entering touch input interacting with virtual compass 420 of FIG. 4B. The user provides touch input selecting a rotatable edge of the virtual compass at location 430, and then provides gesture input 432 dragging the virtual compass in a circular motion. In one mode, the user drags the virtual compass partway around the circle to generate an arc. In another mode, when the user only drags the compass partway around the circle, the device automatically completes the circle for the user. A user can have the option of switching between these two modes using a predefined gesture or other touch input.

Figure 4D:
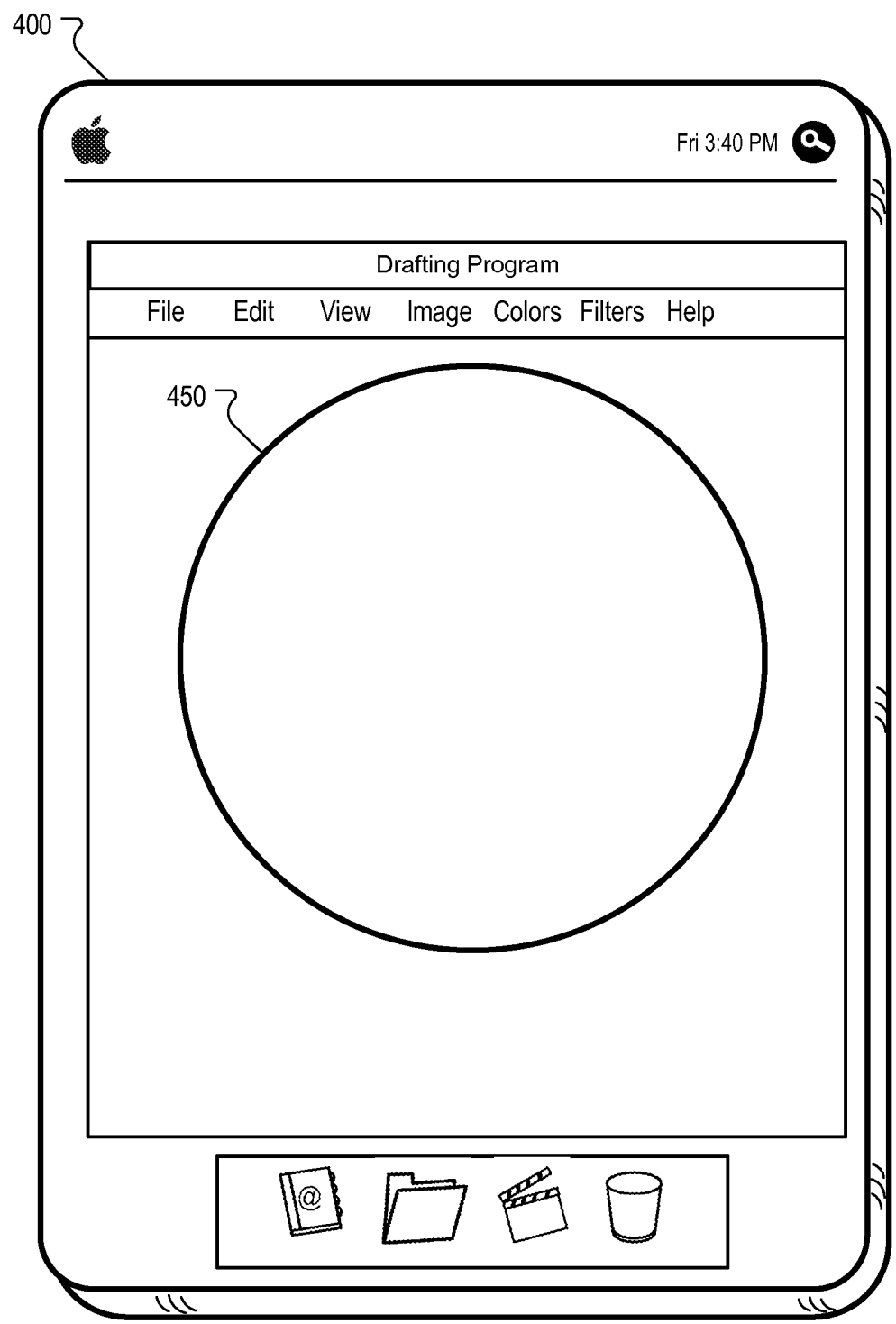
FIG. 4D illustrates a circle generated in response to the touch input of FIG. 4C.

FIG. 4D illustrates circle 450 generated in response to the touch input of FIG. 4C.

Virtual Stencil Tool

Figure 5A:
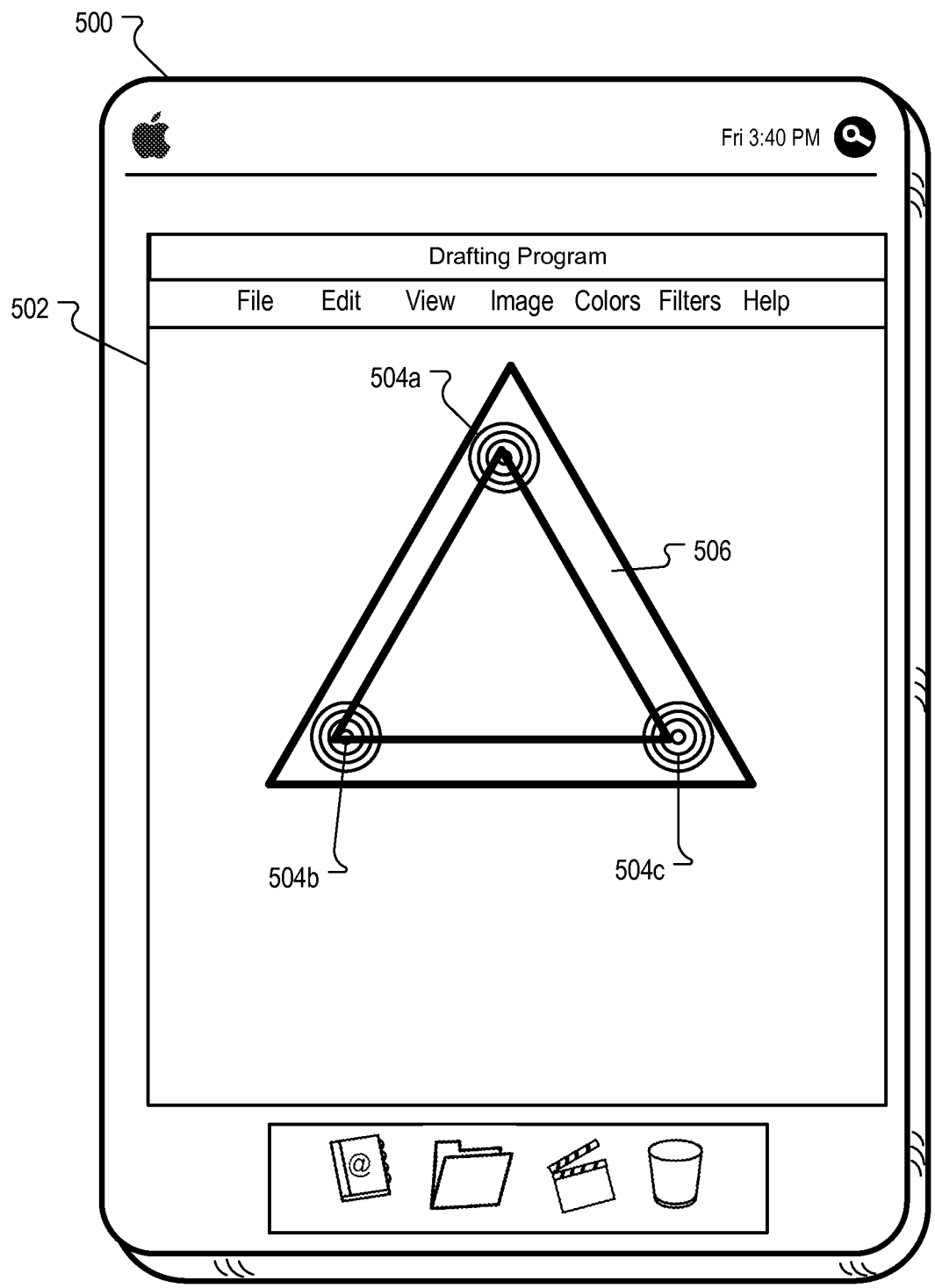
FIG. 5A illustrates an example drafting user interface on a device receiving touch input from a user specifying a virtual triangle stencil.

FIG. 5A illustrates example drafting user interface 502 on device 500 receiving touch input 504 from a user specifying a virtual triangle stencil. The user provides touch input at three locations, 504a, 504b, and 504c. Device 500 matches this touch input to a virtual triangle stencil tool. Device 500 can then display visual representation 506 of a stencil tool corresponding to the user input.

The stencil illustrated in FIG. 5A is just one possible virtual stencil. Other virtual stencils corresponding to other shapes, for example, squares, rectangles, pentagons, and other types of triangles, can also be used by device 500.

Users can alternatively use other touch input to indicate that a stencil tool is desired. For example, a user can use gesture input to draw the shape of the stencil he or she is interested in, and device 500 can identify a stencil best matching the drawn shape.

Figure 5B:
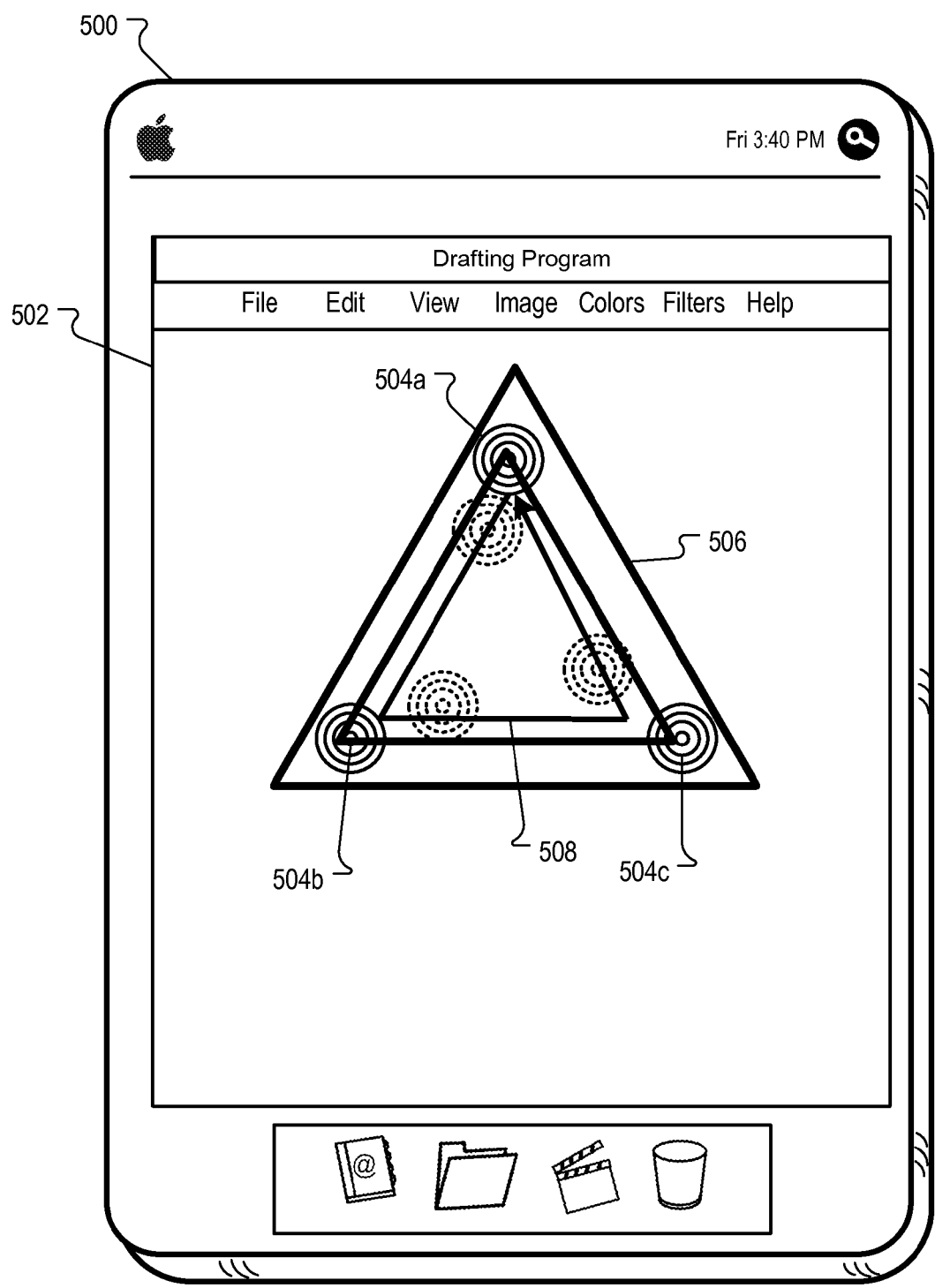
FIG. 5B illustrates example user touch input tracing the virtual stencil of FIG. 5A.

FIG. 5B illustrates example user touch input 508 tracing the virtual stencil of FIG. 5A. In response to this input, device 500 generates a triangle graphical object corresponding to the virtual triangle stencil.

Figure 5C:
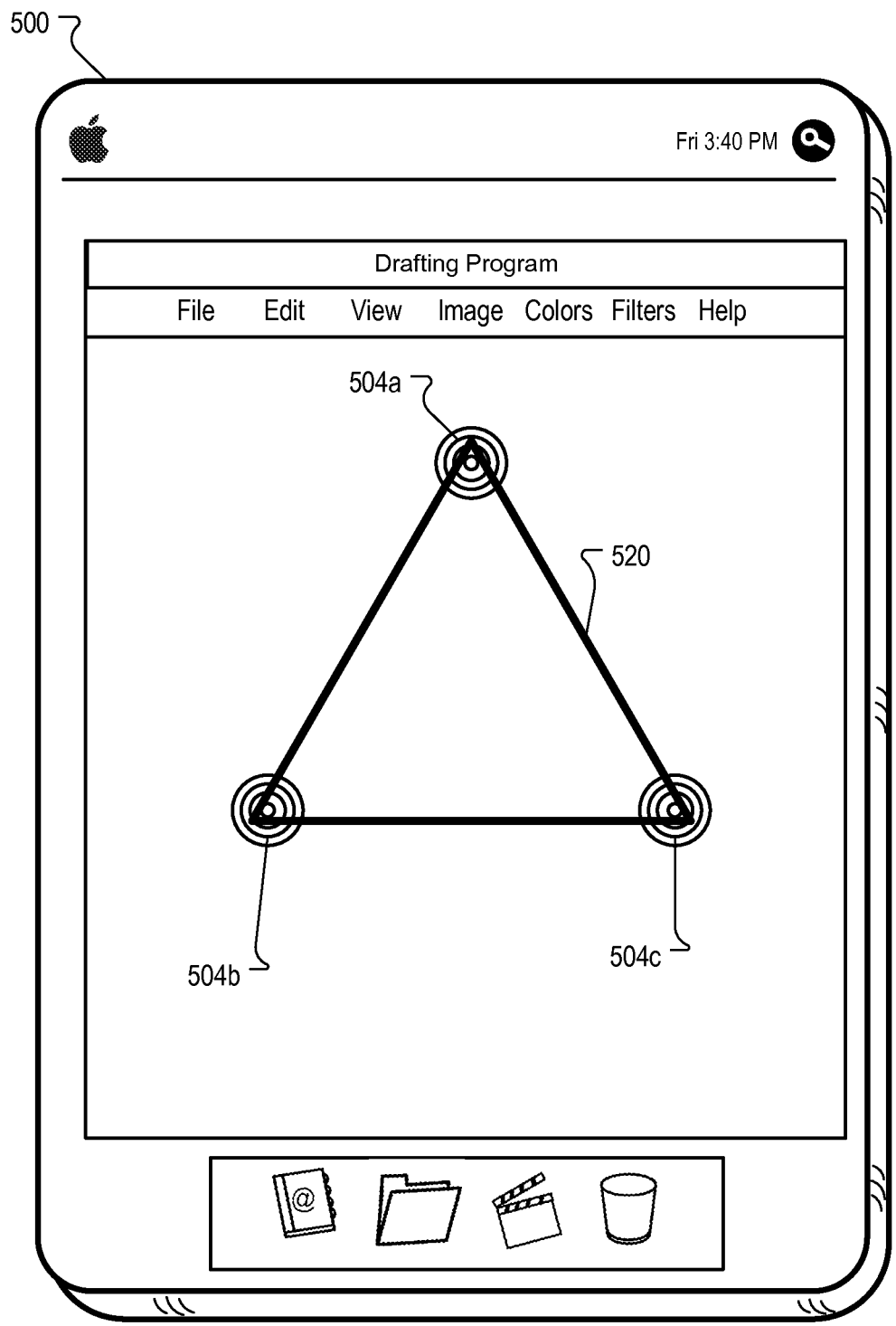
FIG. 5C illustrates a graphical object resulting from the user touch input of FIG. 5B.

FIG. 5C illustrates the graphical object 520 resulting from the user touch input of FIG. 5B. In the example illustrated in FIG. 5C, the user has not yet stopped providing the touch inputs 504a, 504b, and 504c that define the vertices of the virtual triangle stencil tool. In some implementations, when the user changes the touch input (e.g., by moving his or her fingers) after the graphical object is presented, the graphical object is modified to correspond to the new locations specified by the touch input.

Figure 5D:
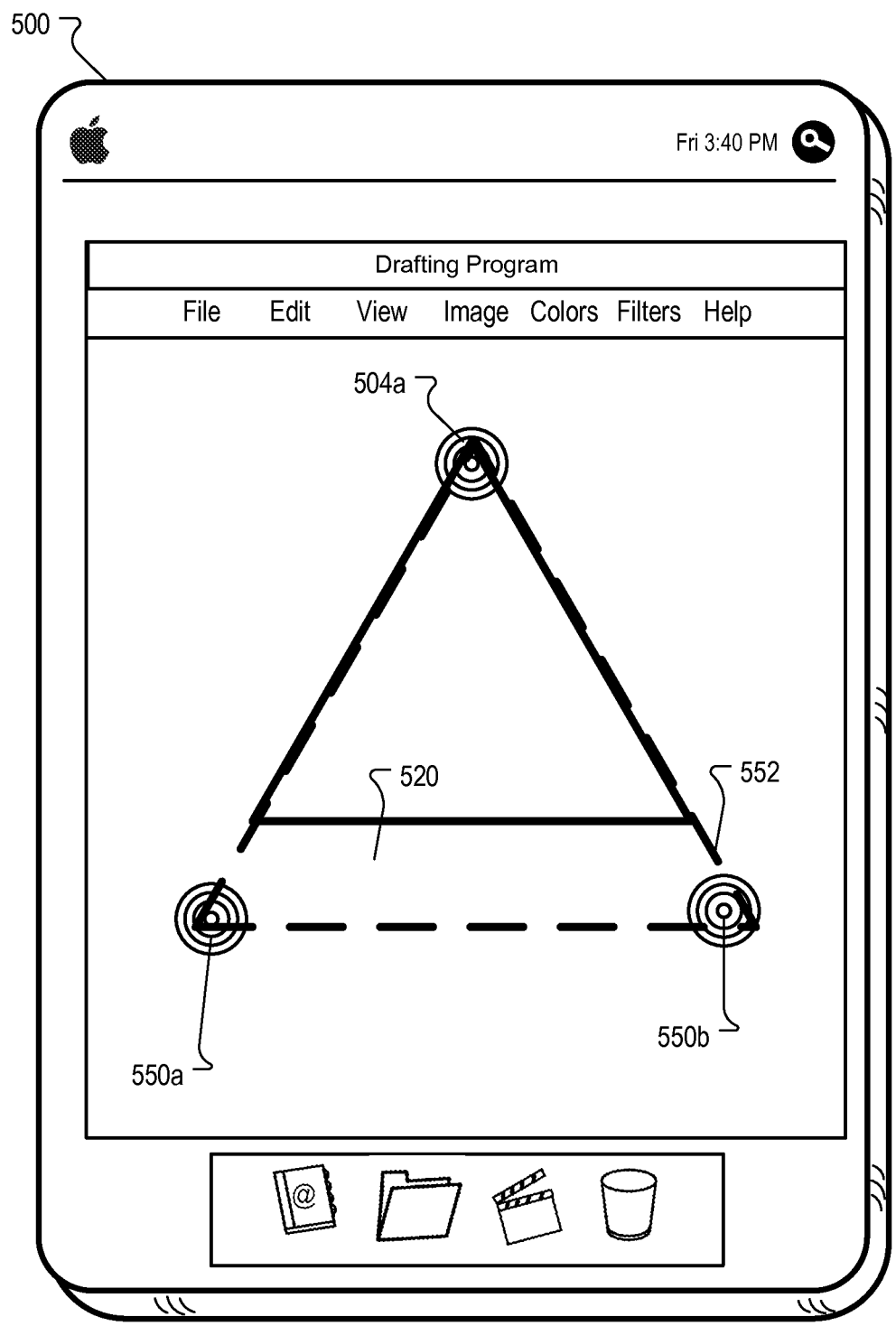
FIG. 5D illustrates an example of modifying the graphical object of FIG. 5C after it has been drawn.

FIG. 5D illustrates an example of modifying graphical object 520 of FIG. 5C after it has been drawn. When a user moves touch inputs 504b and 504c to new locations 550a and 550b, the graphical object shown in the drafting user interface is modified from object 520 to object 552.

In various implementations, the drafting user interface can additionally include one or more features present in conventional drafting user interfaces. For example, the drafting user interface can include options to allow users to select color or shading of their objects, and can provide representations of pre-defined objects that a user can select and drag into a drawing. A pre-defined object can be a graphical object the user previously created and saved. These pre-defined objects are then generated and presented alongside objects the user created using virtual tools.

Example Processes Using Virtual Tools

Figure 6:
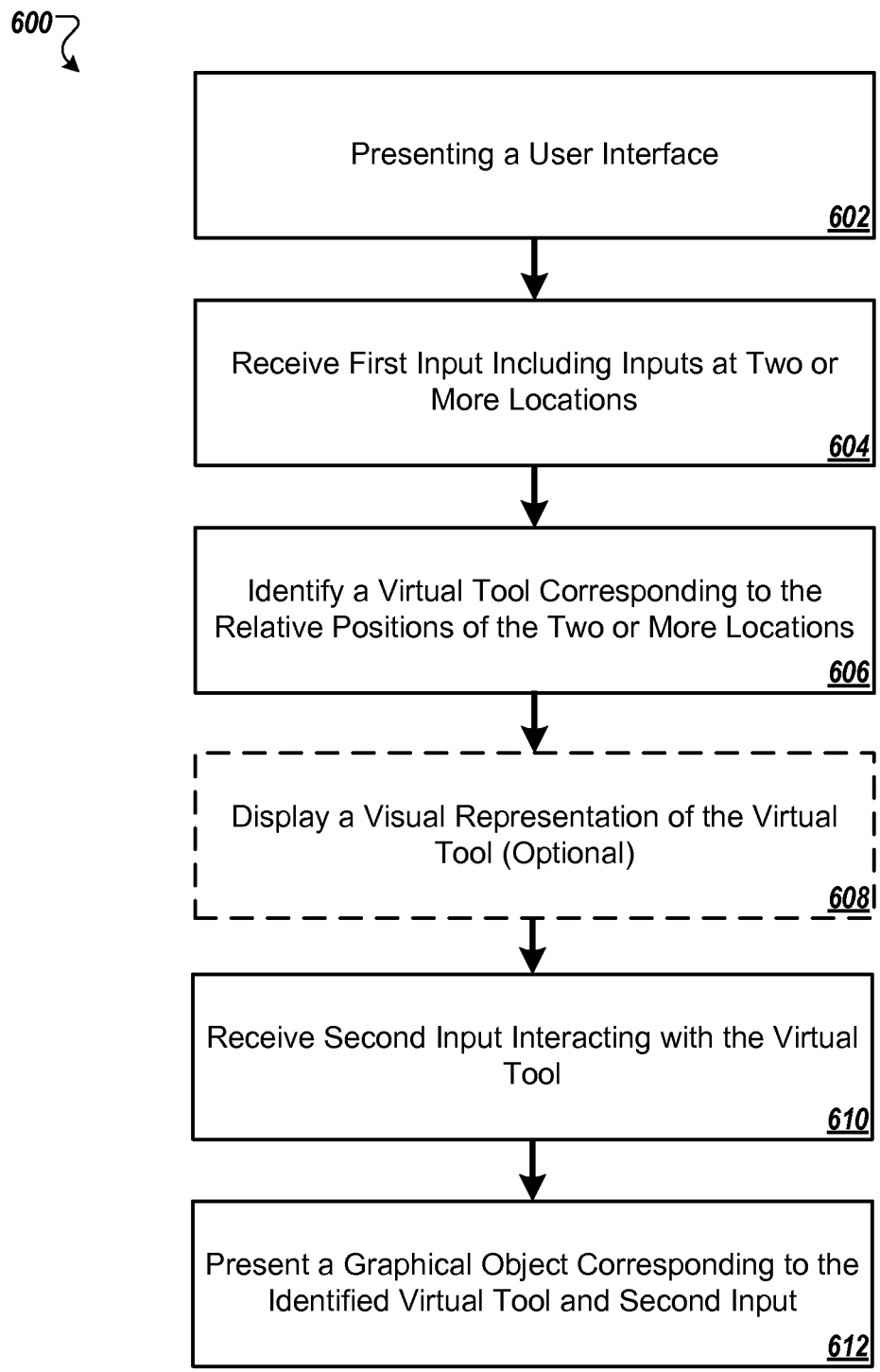
FIGS. 6 and 7 are flow diagrams of example processes for presenting graphical objects corresponding to the use of virtual tools.

FIG. 6 is a flow diagram of example process 600 for presenting graphical objects corresponding to the use of virtual tools. For convenience, example process 600 will be described in reference to a system that performs process 600. The system can be, for example, a drafting application executing on a device.

The system presents a user interface (602). The user interface can be, for example, a drafting user interface. Example drafting user interfaces are described above with reference to FIGS. 2-5.

The system receives first touch input including touch inputs at two or more locations (604). The first touch input can be one or more touch input events received from a touch services module executing on the device. The touch services module is described in more detail below with reference to FIG. 8.

The first touch input can be a single touch input event corresponding to touch inputs received at multiple locations on the drafting user interface, e.g., simultaneously. Alternatively, the first touch input can be made up of multiple touch input events. The system can determine that the multiple touch input events correspond to a single touch input, for example, according to the time delay between the touch inputs, or whether one touch input event still persists when another is touch input event is received.

The system identifies a virtual tool corresponding to the relative positions of the two or more touch input locations (606). The system can make this identification by comparing the relative positions of the locations of the first touch input to stored data defining virtual tools. The system can make this determination, for example, using conventional comparison techniques. For example, in some implementations, the system can compare one or more of the number of points, the distance made between the points, and the positions of the points.

The data can include data for pre-defined virtual tools, e.g., tools defined by the system, and can alternatively or additionally include data for user-defined virtual tools. The data for a virtual tool can include, for example, the number of locations of touch input and the relative positions of the locations. The relative positions of the locations can be represented, for example, by the relative angles between the positions of input or the absolute angles between the positions of input and an origin point. The relative positions can also be represented by relationships between the distance between the locations. For example, for a square stencil tool, the distance between any two points that are parallel to an x or y-axis is equal to the distance between any other two points that are parallel to an x or y-axis. Other relationships, for example, based on a scaling factor that governs the difference in distance between pairs of points in a two-dimensional coordinate frame, can also be used.

In some implementations, if the system identifies multiple virtual tools that correspond to the user's input, the system can ask the user to select between the identified tools.

Once the appropriate virtual tool is identified, the system can also determine an appropriate size for the tool. The size of the tool can be determined from the distance between the touch input locations used to identify the tool and/or the size of the drafting user interface. For example, the length of a ruler virtual tool can be equal to the distance between the two locations of touch input used to request the tool.

The system (optionally) displays a visual representation of the identified virtual tool (608). The visual representation can be defined by data stored by the system. For example, the data can specify that the visual representation of a virtual ruler tool is an image of a ruler (e.g., a rectangle with specific proportions that has tics marked on it). The visual appearance of the visual representation can be governed by one or more user preferences, for example, as described above with reference to FIG. 2.

The system receives a second touch input interacting with the virtual tool (610), for example, from a touch services module executing on the device.

The system presents a graphical object corresponding to the identified virtual tool and second touch input (612), for example, as illustrated in FIGS. 2-5.

The system can generate the graphical object according to the identified virtual tool and the touch input specified in the second touch input event. Each virtual tool can be associated with data defining the functionality of the tool. This data can specify how touch input should be processed to generate the appropriate virtual object. The system can retrieve this stored data and processes the touch input according to the functionality of the virtual tool. The functionality can be represented, for example, as one or more instruction sets that are executed by the system.

For example, the functionality data for a ruler can include one or more program instructions that cause the system to generate a straight line that is parallel to the ruler and immediately adjacent to the edge of the ruler on which the second touch input was received. The instructions can further specify that the start and end points of the line are defined by the start and end points of, for example, a dragging gesture initiating with the second touch input.

In some implementations, the system can also determine an appropriate thickness of the line(s) of the graphical object and/or whether the line(s) are draft lines or final lines. This determination can be made based on the distance between the user's fingers and the drafting user interface, for example, as described above with reference to FIG. 2.

In some implementations, the system further receives touch input corresponding to a modification of the first touch input and modifies the presented graphical object in response to the new input, for example, as illustrated in FIG. 5C. The system can modify the presented graphical object by generating a new graphical object according to the modified user touch input, and then replacing the previous graphical object with the new graphical object.

Figure 7:
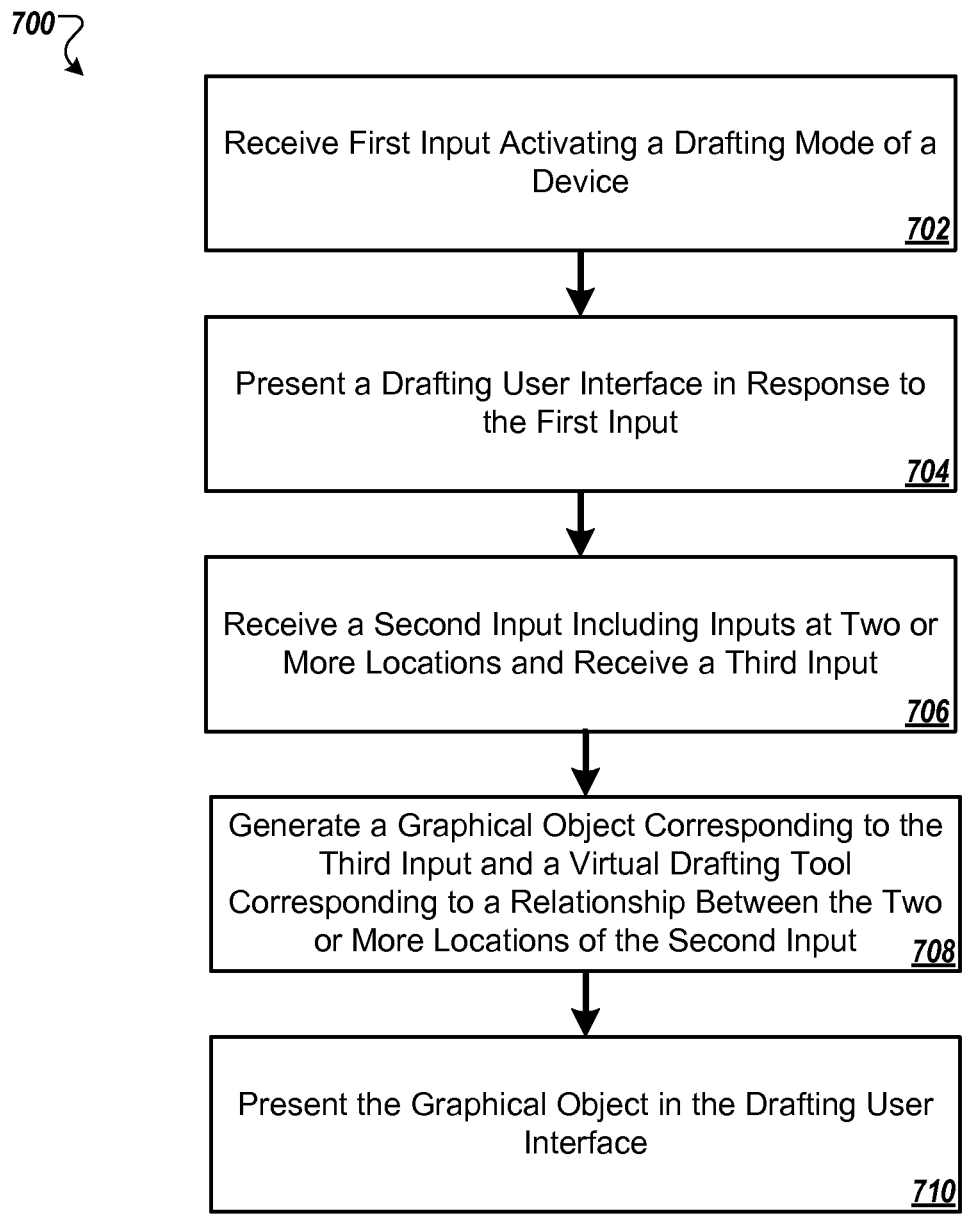

FIG. 7 is a flow diagram of another example process 700 for presenting graphical objects corresponding to the use of virtual tools. For convenience, example process 700 will be described in reference to a system that performs process 700. The system can be, for example, a drafting application executing on a device.

The system receives a first input activating a drafting mode of a device (702). For example, the first input can be input indicating that a user has requested execution of a drafting application on the device. Other inputs can also be received, for example, a user can select a drafting option within a drafting application.

The system presents a drafting user interface in response to the first input (704), for example, as described above with reference to FIGS. 2-5.

The system receives a second touch input including inputs at two or more locations (706), and receives a third touch input. The system generates a graphical object corresponding to the third touch input event and a virtual drafting tool corresponding to a relationship between the two or more locations of the second touch input (708). The relationship between the two or more locations can be a physical relationship, for example, the relative locations of the inputs, as described above with reference to FIG. 6. The system presents the graphical object in the drafting user interface (710), for example, as described above with reference to FIGS. 2-5.

Example Software Architecture

Figure 8:
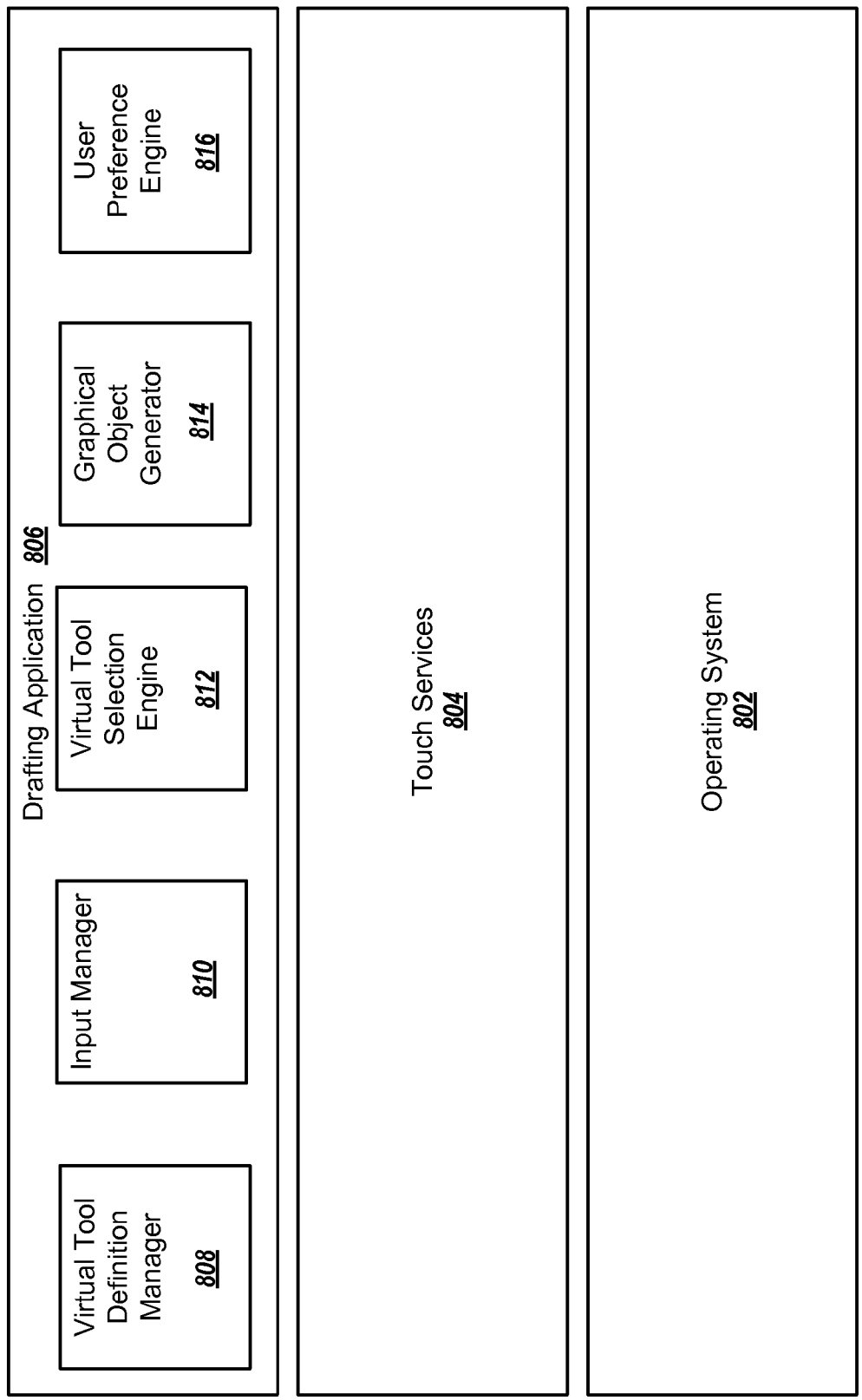
FIG. 8 illustrates example software architecture for implementing virtual drafting tools.

FIG. 8 illustrates example software architecture 800 for implementing virtual drafting tools. Example software architecture 800 can be used to implement the methods described above with reference to FIGS. 6 and 7.

Software architecture 800 can include operating system 802, touch services module 804, and drafting application 806. This architecture can conceptually operate on top of a hardware layer (not shown).

Operating system 802 provides an interface to the hardware layer (e.g., a capacitive touch display or device). Operating system 802 can include one or more software drivers that communicates with the hardware. For example, the drivers can receive and process touch input signals generated by a touch sensitive display or device in the hardware layer. The operating system 802 can process raw input data received from the driver(s). This processed input data can then made available to touch services layer 804 through one or more application programming interfaces (APIs). These APIs can be a set of APIs that are usually included with operating systems (such as, for example, Linux or UNIX APIs), as well as APIs specific for sending and receiving data relevant to touch input.

Touch services module 804 can receive touch inputs from operating system layer 802 and convert one or more of these touch inputs into touch input events according to an internal touch event model. Touch services module 804 can use different touch models for different applications. For example, a drafting application will be interested in events that correspond to input requesting a virtual tool and input interacting with a virtual tool, and the touch model can be adjusted or selected accordingly to reflect the expected inputs.

The touch input events can be in a format (e.g., attributes) that are easier to use in an application than raw touch input signals generated by the touch sensitive device. For example, a touch input event can include a set of coordinates for each location at which a touch is currently occurring on a drafting user interface. Each touch input event can include information on one or more touches occurring simultaneously.

In some implementations, gesture touch input events can also be detected by combining two or more touch input events. The gesture touch input events can contain scale and/or rotation information. The rotation information can include a rotation value that is a relative delta in degrees. The scale information can also include a scaling value that is a relative delta in pixels on the display device. Other gesture events are possible.

All or some of these touch input events can be made available to developers through a touch input event API. The touch input API can be made available to developers as a Software Development Kit (SDK) or as part of an application (e.g., as part of a browser tool kit).

Drafting application 806 can be a drafting application executing on a device. Drafting application 806 can include virtual tool definition manager 808, input manager 810, virtual tool selection engine 812, graphical object generator 814, and user preference engine 816. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

Virtual tool definition manager 808 manages the data for each defined virtual tool. The data can be represented, for example, as a data object, data structure, or according to other data representation conventions. The data can include the relative location data, functionality data, and visual representation data for each tool. This data is described in more detail above with reference to FIG. 6. The data can also include other data for other attributes of the virtual tool.

Input manager 810 receives touch input events from touch services layer 804, for example, through a function call having a defined call convention based on the touch API. Input manager 810 can pull data from touch services layer 804 (e.g., by querying touch services layer 804 for data) or can receive data that is pushed from touch services layer 804 (e.g., as the touch input events are generated by the touch services layer). Input manager 810 processes these events as they are received and provides the event data to virtual tool selection engine 812 or graphical object generator 814, as appropriate.

Virtual tool selection engine 812 receives touch input events from input manager 810 that correspond to a user's request for a virtual tool. Virtual tool selection engine 812 compares the relative positions of input specified in the touch input event to the virtual tool data maintained by virtual tool definition manager 800, and selects the best matching tool, for example, as described above with reference to FIG. 6.

Graphical object generator 814 receives an identified virtual tool and a touch input event corresponding to an interaction with the virtual tool and generates an appropriate graphical object for display, for example, as described above with reference to FIG. 6. The actual drawing of the graphical object can also be a service accessible through a function call defined by a graphics processing service API.

User preference engine 816 manages one or more preferences input by a user, for example, preferences specifying attributes of the visual appearance of virtual tools.

Example Device Architecture

Figure 9:
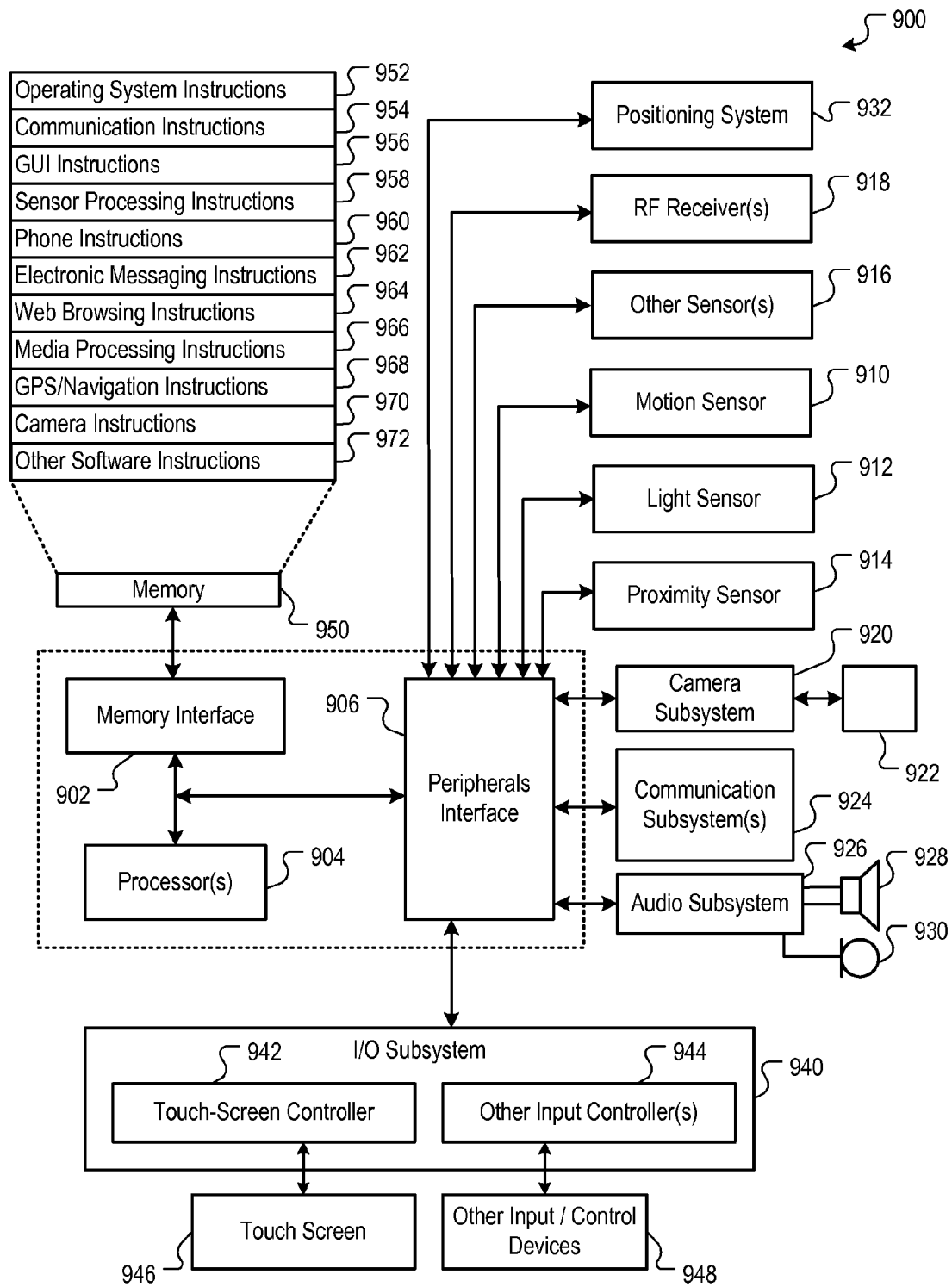
FIG. 9 is a block diagram of an example hardware architecture of a device for implementing virtual drafting tools.

FIG. 9 is a block diagram of example hardware architecture of device 900 for implementing virtual drafting tools. Device 900 can include memory interface 902, one or more data processors, image processors and/or central processing units 904, and peripherals interface 906. Memory interface 902, one or more processors 904 and/or peripherals interface 906 can be separate components or can be integrated in one or more integrated circuits. The various components in device 900 can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate various orientation, lighting, and proximity functions. For example, in some implementations, light sensor 912 can be utilized to facilitate adjusting the brightness of touch screen 946. In some implementations, motion sensor 910 can be utilized to detect movement of the device. Accordingly, display objects and/or media can be presented according to a detected orientation, e.g., portrait or landscape.

Other sensors 916 can also be connected to peripherals interface 906, such as a temperature sensor, a biometric sensor, a gyroscope, or other sensing device, to facilitate related functionalities.

For example, device 900 can receive positioning information from positioning system 932. Positioning system 932, in various implementations, can be a component internal to device 900, or can be an external component coupled to device 900 (e.g., using a wired connection or a wireless connection). In some implementations, positioning system 932 can include a GPS receiver and a positioning engine operable to derive positioning information from received GPS satellite signals. In other implementations, positioning system 932 can include a compass (e.g., a magnetic compass) and an accelerometer, as well as a positioning engine operable to derive positioning information based on dead reckoning techniques. In still further implementations, positioning system 932 can use wireless signals (e.g., cellular signals, IEEE 802.11 signals) to determine location information associated with the device, such as those provided by SKYHOOK WIRELESS of Boston, Mass. Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 918. An RF receiver can receive, for example, AM/FM broadcasts or satellite broadcasts (e.g., XM® or Sirius® radio broadcast). An RF receiver can also be a TV tuner. In some implementations, RF receiver 918 is built into wireless communication subsystems 924. In other implementations, RF receiver 918 is an independent subsystem coupled to device 900 (e.g., using a wired connection or a wireless connection). RF receiver 918 can receive simulcasts. In some implementations, RF receiver 918 can include a Radio Data System (RDS) processor, which can process broadcast content and simulcast data (e.g., RDS data). In some implementations, RF receiver 918 can be digitally tuned to receive broadcasts at various frequencies. In addition, RF receiver 918 can include a scanning function which tunes up or down and pauses at a next frequency where broadcast content is available.

Camera subsystem 920 and optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 924. Communication subsystem(s) 924 can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 924 can depend on the communication network(s) or medium(s) over which device 900 is intended to operate. For example, device 900 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 924 may include hosting protocols such that device 900 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 926 can be coupled to speaker 928 and one or more microphones 930. One or more microphones 1130 can be used, for example, to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to touch screen 946. Touch screen 946 and touch screen controller 942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 946 or proximity to touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of touch screen 946; and a pressing of the button for a second duration that is longer than the first duration may turn power to device 900 on or off. The user may be able to customize a functionality of one or more of the buttons. Touch screen 946 can, for example, also be used to implement virtual or soft buttons and/or a keyboard.

In some implementations, device 900 can present recorded audio and/or video files, such as MP3, AAC, and MPEG files. In some implementations, device 900 can include the functionality of an MP3 player, such as an iPhone™.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can be a kernel (e.g., UNIX kernel).

Memory 950 may also store communication instructions 954 to facilitate communicating with one or more additional devices, one or more computers and/or one or more servers. Communication instructions 954 can also be used to select an operational mode or communication medium for use by the device, based on a geographic location (obtained by the GPS/Navigation instructions 968) of the device. Memory 950 may include graphical user interface instructions 956 to facilitate graphic user interface processing; sensor processing instructions 958 to facilitate sensor-related processing and functions (e.g., the touch services layer 804 described above with reference to FIG. 8); phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions, e.g., mapping a target location; camera instructions 970 to facilitate camera-related processes and functions; and/or other software instructions 972 to facilitate other processes and functions, e.g., drafting functions. Memory 950 may also store other software instructions (not shown), such as web video instructions to facilitate web video-related processes and functions; and/or web shopping instructions to facilitate web shopping-related processes and functions. In some implementations, media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of device 900 may be implemented in hardware and/or in software, including in one or more signal processing and/or application specific integrated circuits.

Example Network Operating Environment for a Device

Figure 10:
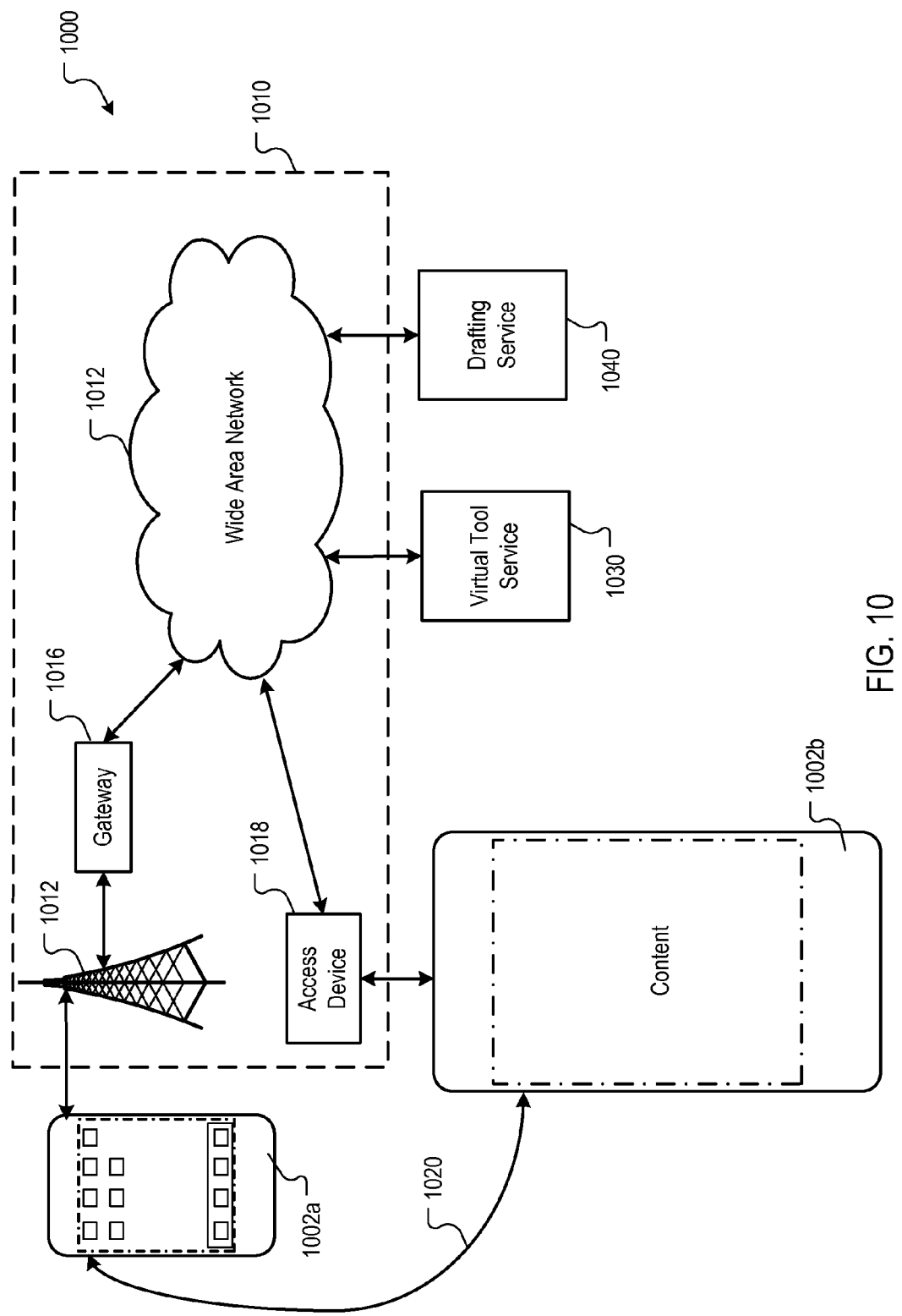
FIG. 10 is a block diagram of an example network operating environment for a device for implementing virtual drafting tools.

FIG. 10 is a block diagram of example network operating environment 1000 for a device for implementing virtual drafting tools. Devices 1002a and 1002b can, for example, communicate over one or more wired and/or wireless networks 1010 in data communication. For example, wireless network 1012, e.g., a cellular network, can communicate with a wide area network (WAN) 1014, such as the Internet, by use of gateway 1016. Likewise, access device 1018, such as an 802.11g wireless access device, can provide communication access to the wide area network 1014. In some implementations, both voice and data communications can be established over wireless network 1012 and access device 1018. For example, device 1002a can place and receive phone calls (e.g., using VoIP protocols), send and receive e-mail messages (e.g., using POP3 protocol), and retrieve electronic documents and/or streams, such as web pages, photographs, and videos, over wireless network 1012, gateway 1016, and wide area network 1014 (e.g., using TCP/IP or UDP protocols). Likewise, in some implementations, device 1002b can place and receive phone calls, send and receive e-mail messages, and retrieve electronic documents over access device 1018 and wide area network 1014. In some implementations, devices 1002a or 1002b can be physically connected to access device 1018 using one or more cables and access device 1018 can be a personal computer. In this configuration, device 1002a or 1002b can be referred to as a "tethered" device.

Devices 1002a and 1002b can also establish communications by other means. For example, wireless device 1002a can communicate with other wireless devices, e.g., other devices 1002a or 1002b, cell phones, etc., over wireless network 1012. Likewise, devices 1002a and 1002b can establish peer-to-peer communications 1020, e.g., a personal area network, by use of one or more communication subsystems, such as a Bluetooth™ communication device. Other communication protocols and topologies can also be implemented.

Devices 1002a or 1002b can, for example, communicate with one or more services over one or more wired and/or wireless networks 1010. These services can include, for example, virtual tool services 1030 and drafting services 1040. Virtual tool services 1030 provide virtual tool definitions and data to a user device, and may also generate graphical objects corresponding to user input, for example, as described above. Drafting service 1040 provides drafting application functionality to a user, for example, as described above.

Device 1002a or 1002b can also access other data and content over one or more wired and/or wireless networks 1010. For example, content publishers, such as news sites, RSS feeds, web sites, blogs, social networking sites, developer networks, etc., can be accessed by device 1002a or 1002b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
presenting a user interface on a display of a device;
receiving first touch input including inputs at two or more locations;
identifying a virtual tool corresponding to relative positions of the two or more locations;
receiving second touch input interacting with the virtual tool; and
presenting a graphical object in the user interface, the graphical object corresponding to the identified virtual tool and the second touch input.

2. The method of claim 1, further comprising:
receiving third touch input corresponding to a modification of the first input; and
modifying the presented graphical object in response to the third touch input.

3. The method of claim 1, further comprising presenting a visual representation of the virtual tool.

4. The method of claim 3, further comprising modifying the visual representation of the virtual tool in response to the second touch input.

5. The method of claim 1, wherein the virtual tool is further identified based on a number of inputs included in the first input.

6. The method of claim 1, wherein identifying a virtual tool comprises comparing the relative positions of the two or more locations to stored data defining virtual tools, and identifying the virtual tool having the best-matching stored data.

7. The method of claim 1, wherein the second input is received while the first input is received.

8. The method of claim 1, wherein the second touch input corresponds to an input received from one or more fingers of a user, the method further comprising determining a thickness of one or more lines for the graphical object according to a physical distance between the fingers of the user and the device.

9. The method of claim 1, wherein the second touch input corresponds to an input received from one or more fingers of a user, the method further comprising determining whether the graphical object is a draft graphical object or a final graphical object according to a physical distance between the fingers of the user and the device.

10. The method of claim 1, wherein the identified virtual drafting tool is one of a ruler, a t-square, a protractor, a compass, or a stencil.

11. The method of claim 1, wherein the first and second inputs are received through the user interface of the device.

12. The method of claim 1, wherein the graphical object corresponds to a stored functionality for the identified virtual tool.

13. An apparatus comprising:
a display;
one or more processors; and
a computer storage medium storing instructions that, when executed by the one or more processors, cause the one or more processors to perform operations comprising:
presenting a user interface on the display;
receiving first touch input including inputs at two or more locations;
identifying a virtual tool corresponding to relative positions of the two or more locations;
receiving second touch input interacting with the virtual tool; and
presenting a graphical object in the user interface, the graphical object corresponding to the identified virtual tool and the second touch input.

14. The apparatus of claim 13, further comprising instructions that, when executed by the one or more processors, cause the one or more processors to perform operations comprising:
receiving third touch input corresponding to a modification of the first input; and
modifying the presented graphical object in response to the third touch input.

15. The apparatus of claim 13, further comprising instructions that, when executed by the one or more processors, cause the one or more processors to perform operations comprising presenting a visual representation of the virtual tool.

16. The apparatus of claim 15, further comprising instructions that, when executed by the one or more processors, cause the one or more processors to perform operations comprising modifying the visual representation of the virtual tool in response to the second touch input.

17. The apparatus of claim 13, wherein the virtual tool is further identified based on a number of inputs included in the first input.

18. The apparatus of claim 13, wherein identifying a virtual tool comprises comparing the relative positions of the two or more locations to stored data defining virtual tools, and identifying the virtual tool having the best-matching stored data.

19. The apparatus of claim 13, wherein the second input is received while the first input is received.

20. The apparatus of claim 13, wherein the graphical object corresponds to a stored functionality for the identified virtual tool.

21. A non-transitory computer readable storage medium storing one or more programs, the one or more programs comprising instructions, which when executed by one or more processors of an electronic device with a display, cause the device to:
present a user interface on the display;
receive first touch input including inputs at two or more locations;
identify a virtual tool corresponding to relative positions of the two or more locations;
receive second touch input interacting with the virtual tool; and
present a graphical object in the user interface, the graphical object corresponding to the identified virtual tool and the second touch input.

22. The non-transitory computer readable storage medium of claim 21, further comprising instructions, which when executed by the one or more processors of the electronic device with the display, cause the device to:
receive third touch input corresponding to a modification of the first input; and
modify the presented graphical object in response to the third touch input.

23. The non-transitory computer readable storage medium of claim 21, further comprising instructions, which when executed by the one or more processors of the electronic device with the display, cause the device to present a visual representation of the virtual tool.

24. The non-transitory computer readable storage medium of claim 23, further comprising instructions, which when executed by the one or more processors of the electronic device with the display, cause the device to:
in response to the second touch input, modify the visual representation of the virtual tool.

25. The non-transitory computer readable storage medium of claim 21, wherein the virtual tool is further identified based on a number of inputs included in the first input.

26. The non-transitory computer readable storage medium of claim 21, wherein identifying a virtual tool comprises comparing the relative positions of the two or more locations to stored data defining virtual tools, and identifying the virtual tool having the best- matching stored data.

27. The non-transitory computer readable storage medium of claim 21, wherein the second input is received while the first input is received.

28. The non-transitory computer readable storage medium of claim 21, wherein the graphical object corresponds to a stored functionality for the identified virtual tool.

* * * * *